United States Patent [19]
Allwine, Jr.

[11] Patent Number: 5,369,323
[45] Date of Patent: Nov. 29, 1994

[54] COMPOSITE MAGNET STEPPER MOTOR
[75] Inventor: Elmer C. Allwine, Jr., Santa Clara, Calif.
[73] Assignee: Slonix Engineering, Santa Clara, Calif.
[21] Appl. No.: 73,405
[22] Filed: Jun. 7, 1993

Related U.S. Application Data

[63] Continuation-in-part of Ser. No. 880,960, May 7, 1992, Pat. No. 5,218,251, which is a continuation-in-part of Ser. No. 784,207, Oct. 28, 1991.
[51] Int. Cl.$^5$ ........................ H02K 37/14; H02K 1/22
[52] U.S. Cl. ..................................... 310/49 R; 310/192
[58] Field of Search ...................... 310/49 R, 191, 192
[56] References Cited

U.S. PATENT DOCUMENTS

| | | | |
|---|---|---|---|
| 2,615,227 | 10/1952 | Hornik | 24/303 |
| 3,317,829 | 5/1967 | Kuhrt et al. | 324/69 |
| 3,319,100 | 5/1967 | Erickson | 310/168 |
| 3,392,294 | 7/1968 | Campbell | 310/168 |
| 3,421,033 | 1/1969 | Hoffmeyer | 310/172 |
| 3,428,837 | 2/1969 | Morreale et al. | 310/49 |
| 3,488,615 | 1/1970 | Yando | 335/285 |
| 3,504,208 | 3/1970 | Rivers | 310/156 |
| 3,504,253 | 3/1970 | Kavanaugh | 318/138 |
| 3,541,410 | 11/1970 | Rothert | 318/174 |
| 3,558,941 | 1/1971 | Brebbia et al. | 310/49 |
| 3,590,294 | 6/1971 | Inagaki | 310/162 |
| 3,633,138 | 1/1972 | Baermann | 335/217 |
| 3,646,376 | 2/1972 | Anderson | 310/156 |
| 3,742,243 | 6/1973 | Gamble | 307/106 |
| 3,898,599 | 8/1975 | Reid et al. | 335/302 |
| 3,940,645 | 2/1976 | Takita | 310/156 |
| 4,086,519 | 4/1978 | Persson | 318/254 |
| 4,224,590 | 9/1980 | Spodig | 335/306 |
| 4,274,053 | 6/1981 | Ito et al. | 324/174 |
| 4,388,545 | 6/1983 | Honsinger et al. | 310/156 |
| 4,399,595 | 8/1983 | Yoon et al. | 24/201 B |
| 4,406,958 | 9/1983 | Palmero et al. | 310/49 R |
| 4,499,420 | 2/1985 | Shiraki et al. | 324/174 |
| 4,528,473 | 7/1985 | Tezuka | 310/256 |
| 4,642,496 | 2/1987 | Kerviel et al. | 310/68 B |
| 4,803,425 | 2/1989 | Swanberg | 324/173 |
| 4,820,951 | 4/1989 | Sugiura et al. | |
| 4,941,236 | 7/1990 | Sherman et al. | 24/303 |
| 5,099,659 | 3/1992 | Carranza et al. | 63/2 |
| 5,132,581 | 7/1992 | Kusase | 310/263 |
| 5,142,181 | 8/1992 | Newell | 310/268 |
| 5,148,070 | 9/1992 | Frye et al. | 310/168 |
| 5,161,361 | 11/1992 | Talley et al. | 310/68 B X |
| 5,177,393 | 1/1993 | Webber | 310/68 B |

FOREIGN PATENT DOCUMENTS

| | | |
|---|---|---|
| 0020178 | 12/1980 | European Pat. Off. |
| 2847203 | 5/1979 | Germany |
| 52-3969 | 12/1977 | Japan |
| 3-45144 | 2/1991 | Japan |
| 3-70450 | 3/1991 | Japan |
| 6603196 | 9/1966 | Netherlands |
| 893986 | 4/1962 | United Kingdom |
| 1436716 | 5/1973 | United Kingdom |
| 1617548A | 12/1990 | U.S.S.R. |

OTHER PUBLICATIONS

G. A. Clark, "Rotary Tachometer/Encoder", IBM Tech. Disc., Bull. vol. 18, No. 9, Feb., 1976, p. 2787.

Primary Examiner—Steven L. Stephan
Assistant Examiner—Judson H. Jones
Attorney, Agent, or Firm—Skjerven, Morrill, MacPherson, Franklin & Friel

[57] ABSTRACT

A stepper motor is provided that is compact, easily manufactured, and provides high torque. The stepper motor comprises a multi-pole composite magnet which functions as a rotor, at least one stator member which determines the angular position of this rotor, and means for positioning the rotor and the stator members on a common axis. The composite magnet comprises two pieces, each piece having a mating member and an arc-shaped member integrally formed with the mating member. To form the composite magnet, the mating members of both pieces are aligned on an axis and the arc-shaped members of both pieces are juxtaposed. The first and second pieces are magnetized in opposite axial directions which results in two advantages. First, the composite magnet provides a high area of energy conversion per unit volume, thereby significantly reducing the size of the stepper motor in comparison to prior art stepper motors. Second, because the projections and apertures are magnetized in opposite axial directions, the magnetic poles are extremely well-defined thereby ensuring that the composite magnet provides both accuracy and high torque capability.

20 Claims, 21 Drawing Sheets

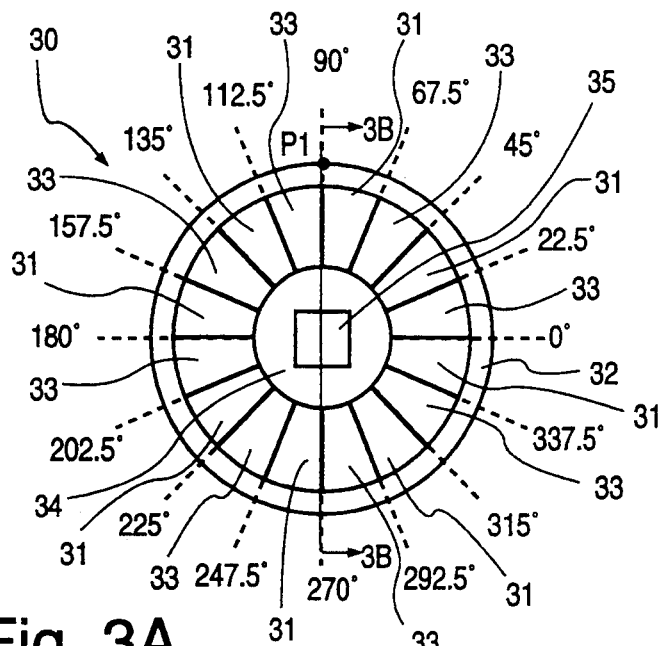
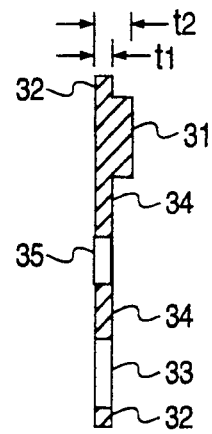
Fig. 3A  Fig. 3B
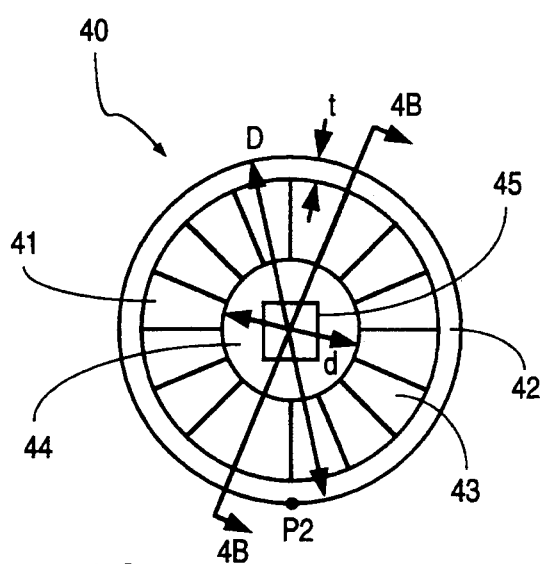
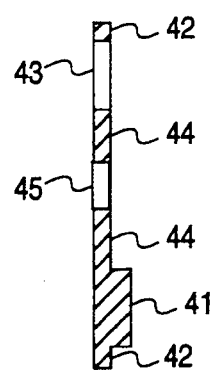
Fig. 4A  Fig. 4B

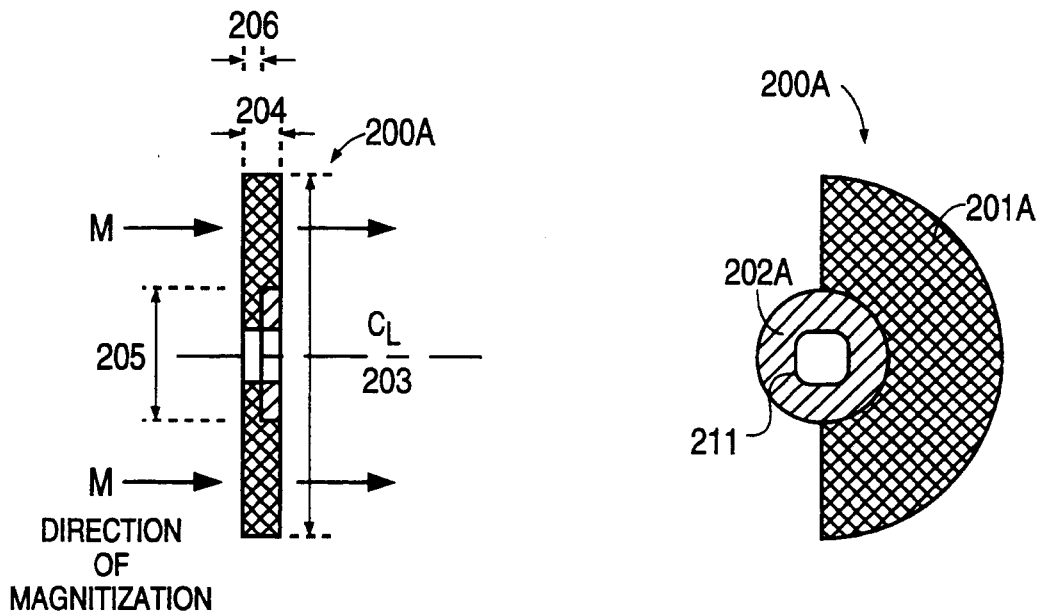
FIG. 17B
FIG. 17A
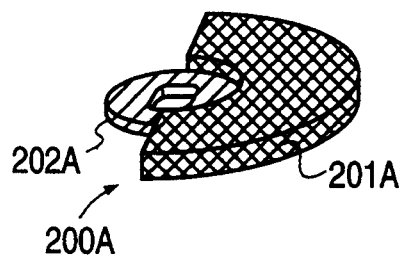
FIG. 17C
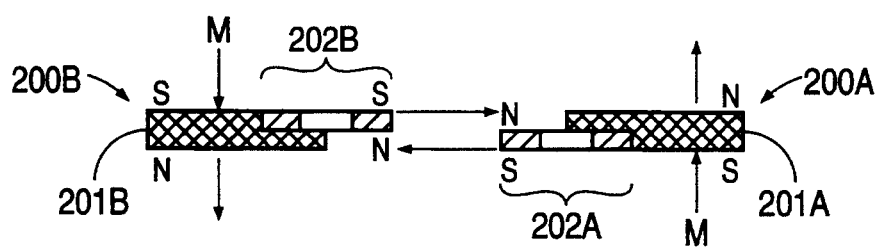
FIG. 17D

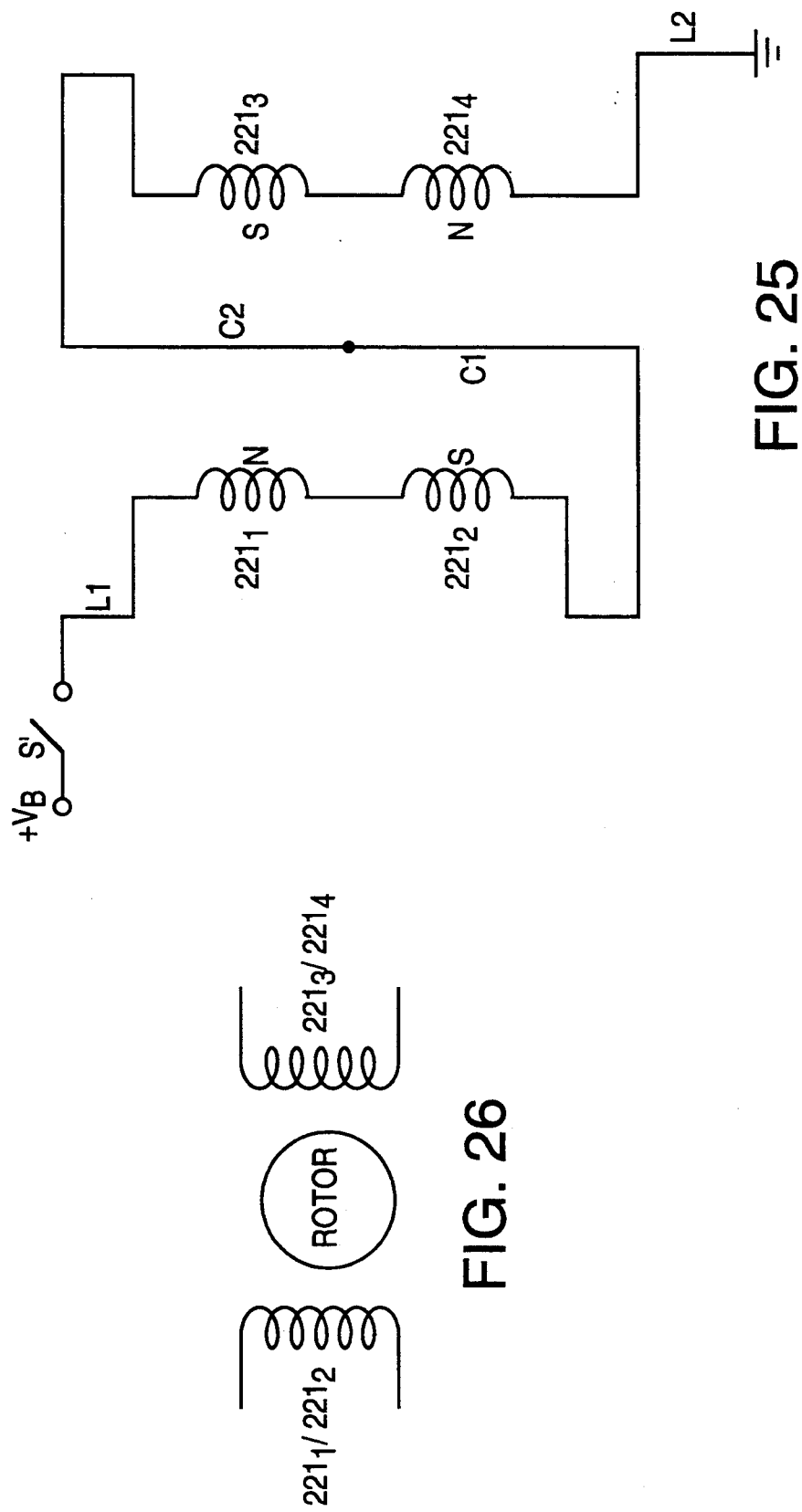

ize: 5,369,323

COMPOSITE MAGNET STEPPER MOTOR

CROSS REFERENCE TO RELATED APPLICATIONS

This is a continuation-in-part of U.S. Pat. No. 5,218,251, issued Jun. 8, 1993, filed as Ser. No. 880,960 on May 7, 1992 entitled, "Composite Magnet Stepper Motor" which is a continuation-in-part of the parent application Ser. No. 07/784,207, entitled, "Multi-Pole Composite Magnet", filed by Elmer C. Allwine, Jr. on Oct. 28, 1991.

BACKGROUND OF THE INVENTION

1. Field of the Invention

This invention relates to stepper motors, and in particular to a stepper motor which uses a composite magnet.

2. Description of Related Art

U.S. Pat. No. 4,207,483, issued to Baer, discloses an electric stepper motor using a rotor having embedded permanent magnets which are polarized in an axial direction. Energizing one of two coils associated with two stator members causes the rotor to move one detent position.

One major drawback in this motor is the difficulty in manufacturing the rotor. Baer teaches that twelve permanent magnet regions are equally spaced around the circumference of a ceramic ring which is affixed to the hub of the motor. For optimal performance, the centers of the permanent magnet regions are located at the same radial position from the motor axis as the radial centers of the stator pole teeth. For these conditions to be met, precise tooling of all twelve permanent magnet regions, as well as the ceramic ring, is required. Moreover, assembly of the permanent magnet regions into the ceramic ring is time and labor intensive.

Therefore, a need arises for a stepper motor having a rotor which provides well-definced poles as well as ease of manufacture at a reasonable cost.

SUMMARY OF THE INVENTION

In accordance with the present invention, a stepper motor is compact, easily manufactured, and provides high torque. The stepper motor comprises a multi-pole composite magnet which functions as a rotor, at least one stator member which determines the angular position of this rotor, and means for positioning the rotor and the stator member on a common axis.

The composite magnet comprises two pieces, each piece having a mating member and an arc-shaped member integrally formed with the mating member. To form the composite magnet, the mating member of both pieces are aligned on an axis and the arc-shaped member of both pieces are juxtaposed. The first and second pieces are magnetized in opposite axial directions which results in two advantages. First, the composite magnet provides a high area of energy conversion per unit volume, thereby significantly reducing the size of the stepper motor in comparison to prior art stepper motors. Second, because the projections and apertures are magnetized in opposite axial directions, the magnetic poles are extremely well-defined and, in fact, are magnetized to full saturation across all poles, thereby ensuring that the composite magnet provides both accuracy and high torque capability.

Each stator member has at least one pole piece which is positioned in operative relation to the composite magnet. In the present invention, coil windings are formed or positioned on each pole piece. Applying current to these coil windings determines the polarity of the at least one pole piece on that stator member.

BRIEF DESCRIPTION OF THE DRAWINGS

FIGS. 3A and 3B illustrate an embodiment of the present invention for a stepper motor in which one-half of the composite magnet comprises both projections and apertures.

FIGS. 4A and 4B show the complementary half of the composite magnet shown in FIGS. 3A and 3B.

FIGS. 17A, 17B, and 17C illustrate a planar, side, and oblique view, respectively, of one-half of another composite magnet for an application in a stepper motor.

FIG. 17D illustrates a side of the structure of FIGS. 17A and 17B in exploded relation relative to its complement structure.

FIG. 25 shows a unipolar drive connection in accordance with the stepper motor of the present invention.

FIG. 26 illustrates that the two phases on one stator member are positioned at 180° magnetically from the two phases on the other stator member.

DETAILED DESCRIPTION OF THE DRAWINGS

Figure 1A:
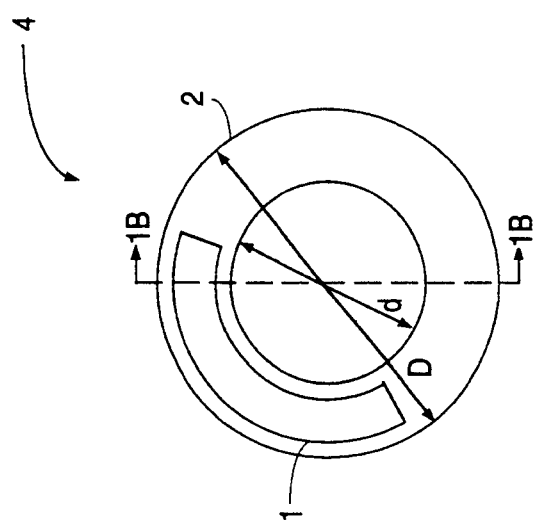
FIGS. 1A and 1B illustrate one-half of the composite magnet having a projection on its surface.
Figure 1B:
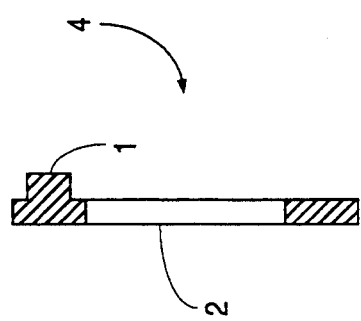
Figure 2A:
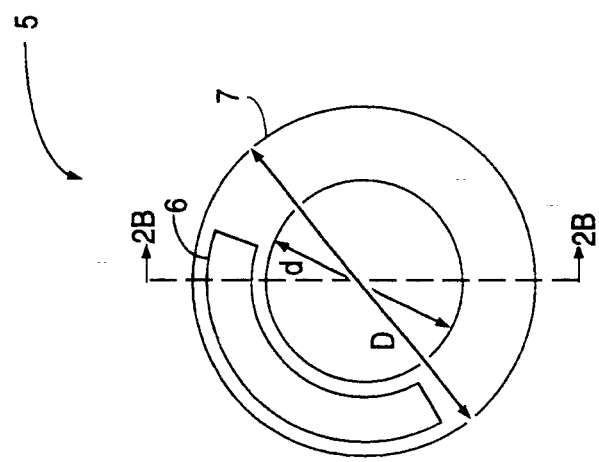
FIGS. 2A and 2B show the complementary half of the composite magnet shown in FIGS. 1A and 1B which has an aperture in its surface.
Figure 2B:
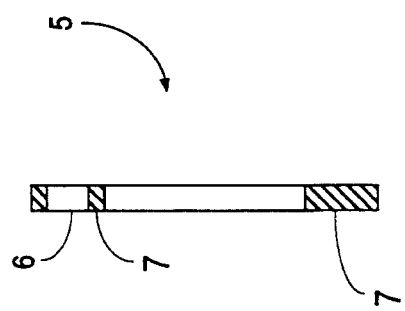

FIGS. 1A, 1B, 2A and 2B illustrate one embodiment of a composite magnet in which each piece of the composite magnet either has a projection or an aperture. FIG. 1A illustrates a planar view of a magnet 4 which has a protrusion 1 formed integrally with a structural member 2. FIG. 1B shows a cross-section of magnet 4 shown in FIG. 1. FIG. 2A illustrates in planar view a magnet 5 which is the complementary piece to magnet 4 shown in FIGS. 1A and 1B. Magnet 5, in contrast to magnet 4, has an aperture 6 which extends through a structural member 7. FIG. 2B shows a cross-section of magnet 5.

Projection 1 formed on magnet 4 shown in FIG. 1B matches the aperture 6 formed on magnet 5 shown in FIG. 2B. Specifically, to join magnet 4 with magnet 5, protrusion 1 mates with aperture 6. Because each half of the composite magnet, magnet 4 or magnet 5, is magnetized in an opposite axial direction to the other half (as will be described later in reference to FIG. 5), complete saturation is possible, i.e. a particular pole is homogeneously established at a particular strength throughout the whole member.

In some prior art rotors, a lack of well-defined north-south poles occurs because of the "Block wall" effect. A "Block wall" effect typically occurs if a north and south pole are provided on the same piece of material. When a "Block wall" occurs, the transition from one polarity to another is accompanied by a decrease in the magnetic field and a gradual switching from north to south and from south to north poles. In other words, a finite distance through the material is required to complete the transition from one pole to another. Generally, the distance associated with the polarity switch is too large to allow well-defined poles to be constituted. Moreover, because magnets are typically formed from ferrite particles which are of varying sizes, in addition to impurities present in manufacturing, the transition distance may actually vary, thereby further worsening pole definition. Ill-defined poles in a rotor cause highly undesirable angular positioning inaccuracies.

In contrast, a composite magnet in accordance with the present invention has poles which are formed in different pieces of material. In this manner, irrespective of the homogeneity of the material comprising the magnet or impurities present in the material due to manufacturing, the transition distance between poles is geometrically fixed. Specifically, when magnet 4 is joined to magnet 5, the transition region from north to south poles, and vice versa (described above as the "Bloch wall" effect) is virtually eliminated, thereby providing extremely well-defined poles.

Projection 1 has the same depth as aperture 6. Hence, when magnet 4 and magnet 5 are joined, the outer surface of the composite magnet is flush. In this manner, the present invention solves the problem of mechanical alignment experienced in the prior art, thereby expanding possible applications for the composite magnet.

FIGS. 3A, 3B and 4A and 4B illustrate one embodiment of a composite magnet for a stepper motor, wherein the composite magnet includes two pieces each having projections and apertures. FIG. 3A shows a top view of one-half of the composite magnet in accordance with the present invention. In FIG. 3A, magnet 30 has protrusions 31, structural members 32 and 34 (outer and inner, respectively), apertures 33, and shaft hole 35. FIG. 3B shows magnet 30 in cross-section.

FIG. 4A illustrates magnet 40, the complementary (and identical) half to magnet 30. Magnet 40, as seen in FIG. 4A, comprises projections 41, structural members 42 and 44 (outer and inner, respectively), apertures 43, and shaft hole 45. FIG. 4B shows magnet 40 in cross-section. In this embodiment, magnets 30 and 40 have an inner diameter d of 0.70 inches (1.78 cm) and an outer diameter D of 1.40 inches (3.56 cm). The angular width of outer member 32/42 is 0.05 inches (0.13 cm), whereas the thickness t1 of this member is 0.10 inches (0.254 cm). The thickness t2 of each protrusion 33/43 is 0.10 inches (0.254 cm), while each aperture 31/41 is 0.10 inches (0.254 cm) deep. The angular distance from any edge on protrusions 33/43 to an adjacent protrusion edge is 22.5°. Note that all measurements are approximate and refer to only one embodiment of the present invention.

Magnet 30 mates with magnet 40 to form the composite magnet. For example, magnets 30 and 40 are joined such that point P1 on magnet 30 and point P2 on magnet 40 are adjacent, and projections 31 fit in apertures 43. As mentioned previously, because projections 31 have a height equal to the depth of apertures 43, the resulting composite magnet has a flush outer surface having a thickness of 0.2 inches (0.508 cm).

Figure 5:
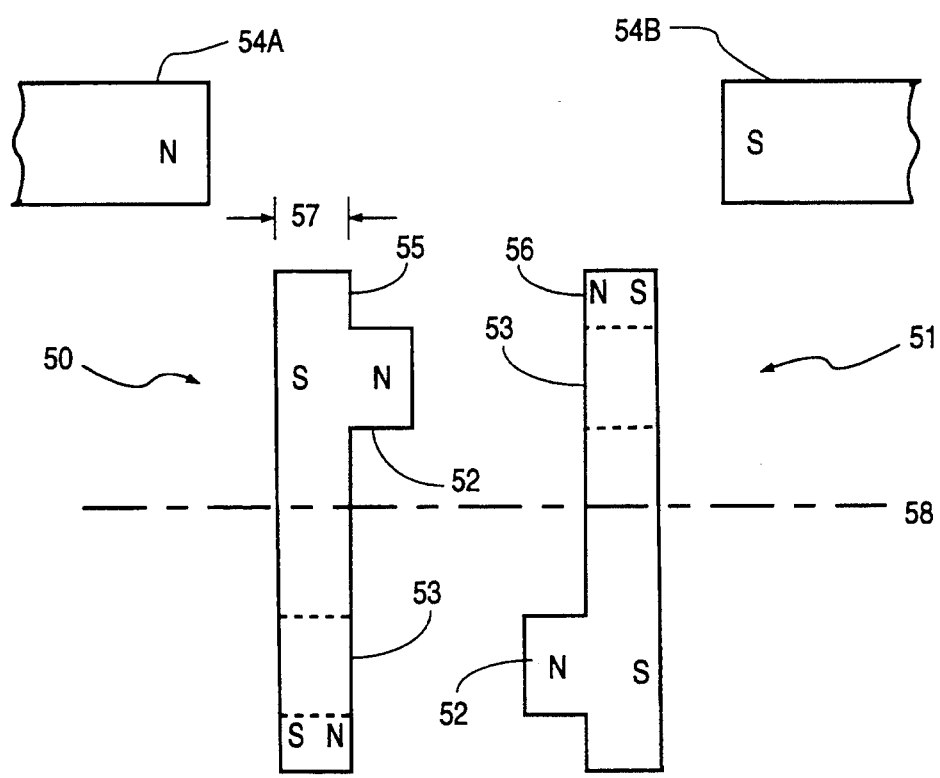
FIG. 5 shows one magnetizing process for composite magnet pieces in accordance with the present invention.

The magnetizing of the two halves of the composite magnet, such as magnets 30 and 40, is shown in FIG. 5. North and south poles are established on members 50 and 51 using conventional methods, such as magnetizing by two pole pieces 54A and 54B (north and south, respectively). This method is extremely simple and cost effective. Note that members 50 and 51 may be physically magnetized at the same time by positioning either member 50 or 51 on its opposite side, thereby lining up the poles in one direction. Because members 50 and 51 are magnetized in opposite axial directions, i.e. for purposes of joining the two members, when member (now magnet) 50 nears member (now magnet) 51 there is an initial repulsion due to the fact that the respective north poles of each magnet are getting closer.

However, once a projection 52 is introduced into an aperture 53, the attraction between the north and the south poles of the other magnet draws magnets 50 and 51 together. Because of the configuration of mating pieces 50 and 51, a slight repulsion exists between surface 55 of magnet 50 and surface 56 of magnet 51. Although the attractive forces mentioned above are much greater than these repulsive forces, a fast-setting bonding agent may be used on the mating surfaces of magnets 50 and 51 to ensure no gaps are formed after joining of the two magnets.

The strong bond between magnets 50 and 51 forms the composite magnet. In this manner, the composite magnet acts as a single permanent magnet exhibiting a magnetic pattern of north-south poles matching the pattern of projections and apertures. Note that the above-described method of magnetizing results in axial north-south poles, i.e. the poles being positioned about axis 58, not radially spreading from a common center.

The size of the protrusions and apertures of the composite magnet as illustrated in FIGS. 1–4 varies, depending on the particular application for which the composite magnet is used. Manufacturing of the complementary halves of the composite magnet is accomplished using conventional machining or injection molding processes (which significantly reduces manufacturing cost). Preferred materials for making the composite magnet include, but are not limited to: barium ferrite in plastic form, for example 3M Brand Magnet Material B1060-B1062; for higher energy product, neodymium boron in plastic form, sold by Tengam under the trade-name "NeoComp"; rare-earth materials, such as samarium cobalt, if expense warrants their usage; or any moldable ceramic grades of material.

Because the composite magnet is typically formed from a mold which is very accurately machined, the angular positioning of the north and south poles is virtually perfect. Also, the region between any north and south pole, is very narrow (approximately $\frac{1}{2}$ degree), and located along a very accurate radial line. This narrow region ensures the composite magnet will exhibit an extremely rapid transition between any north-to-south pole or any south-to-north pole. This high rate of change in magnetic polarity (generally described in the art as $d\phi/d\theta$) being very accurately located with respect to any angular line results in a very small angular positioning error.

A stepper motor is generally used in an "open-loop" digitally controlled positioning system which provides no feedback to determine an absolute position of the rotor. Therefore, minimizing error in the "step" of the stepper motor, i.e. the position of the rotor, is highly desirable. In accordance with the present invention, the composite magnet significantly reduces positioning error by providing an extremely high rate of change in magnetic polarity.

Additionally, in many conventional stepper motors, the magnetic field is established around the outer circumference of a long cylinder. In contrast, in the present invention the magnetic field of the composite magnet (described in detail in reference to FIG. 14) emanates from both sides of a relatively thin disc, thereby dramatically altering the geometry of the energy conversion space. Specifically, while a conventional stepper motor has a radial magnetic field applying force to radially-oriented electromagnetic poles, the present invention has an axial magnetic field applying force to axially-oriented electromagnetic poles. Thus, the composite magnet significantly increases the area for energy conversion per unit volume in comparison to convention stepper motors. For example, it is well known that the surface area of a cylinder for a typical prior art rotor is equal to $2\pi rh_1$ and the surface area of two circular surfaces of the composite magnet in accordance with the present invention is $2\pi r^2$ (where r is the radius of both the cylinder and the composite magnet and $h_1$ is the height of the cylinder). It logically follows that for the surface areas, i.e. the areas available for the purpose of energy conversion, of the cylinder and the composite magnet to be equal, the height $h_1$ of the cylinder must equal the radius r of the composite magnet. Note the volume of the cylinder is represented by $\pi r^2 h_1$, whereas the volume of the composite magnet is represented by $\pi r^2 h_2$ (where $h_2$ is the thickness of the composite magnet). Thus, the following ratio is derived:

$$\frac{\text{Volume of composite magnet}}{\text{Volume of cylinder}} = \frac{\pi r^2 h_2}{\pi r^2 h_1} = \frac{h_2}{h_1}$$

In typical applications, the thickness $h_2$ of the composite magnet is 0.2 inches, whereas the height $h_1$ of the cylinder is 1 inch. Using the illustrative measurements above, a ratio of 1 to 5 is derived. This means that for equal surface areas available for energy conversion the composite magnet is at least five times smaller in volume.

Thus, for equal surface areas, i.e. effective energy conversion areas, a rotor comprising a composite magnet, in comparison to a conventional rotor comprising a cylinder, provides a more effective use of volume in a stepper motor. Therefore, to provide a given torque, the volume of a stepping motor in accordance with the present invention can be considerably reduced when compared to the prior art. Indeed, the present invention results in a more densely concentrated energy conversion volume where the permanent magnet flux density interacts with the electromagnetic poles. Hence, a higher torque output per unit volume is provided.

Moreover, it is also well known in the art that the moment of inertia of a cylinder is equal to $\frac{1}{2}mr^2$, where m is the mass which is equal to the density of the material times the volume. Therefore, assuming similar materials are used for both the cylindrical rotor and for the composite magnet, the composite magnet provides a lower moment of inertia than the prior art rotor, and thus a higher stepping rate results.

Figure 6:
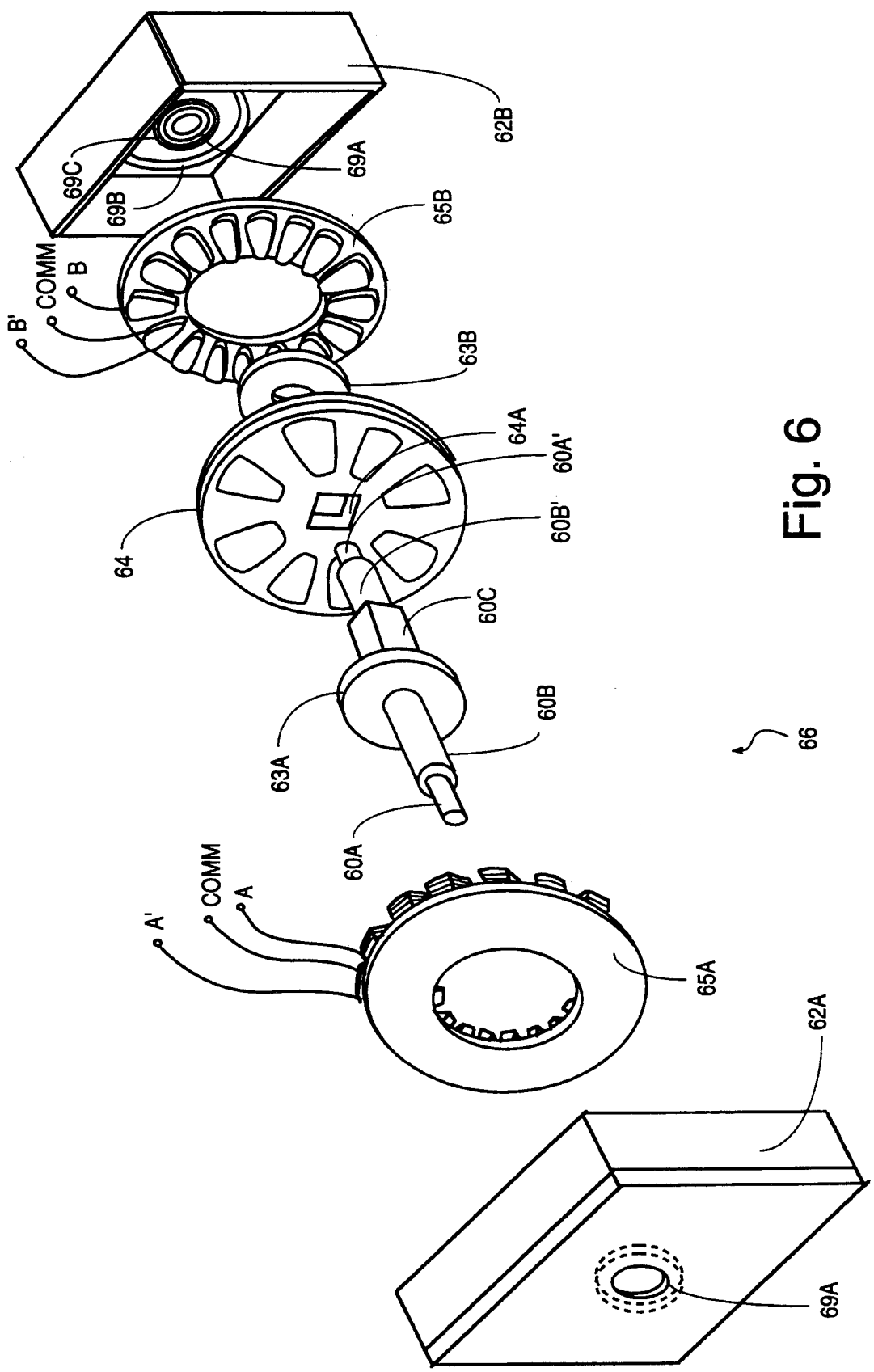
FIG. 6 illustrates an exploded perspective view of the composite magnet stepping motor in accordance with the present invention.

FIG. 6 illustrates a stepper motor 66 in accordance with the present invention which includes a composite magnet 64. In FIG. 6, the motor shaft 60 in one embodiment comprises three sections. Section 60C supports and secures composite magnet 64 which functions as a rotor. In this embodiment, composite magnet 64 includes a hole 64A in its center which mates identically with section 60C (a $\frac{1}{4}$ inch square member) of shaft 60. The square hole in composite magnet 64 and the shaft section 60C in combination prevent any slippage on shaft 60. Other shapes for hole 64A and shaft section 60C may be used to prevent angular slippage of composite magnet 64 on shaft 60. Sections 60B and 60B' secure left and right spacers 63A and 63B, respectively, which will be described in detail later.

Figure 7:
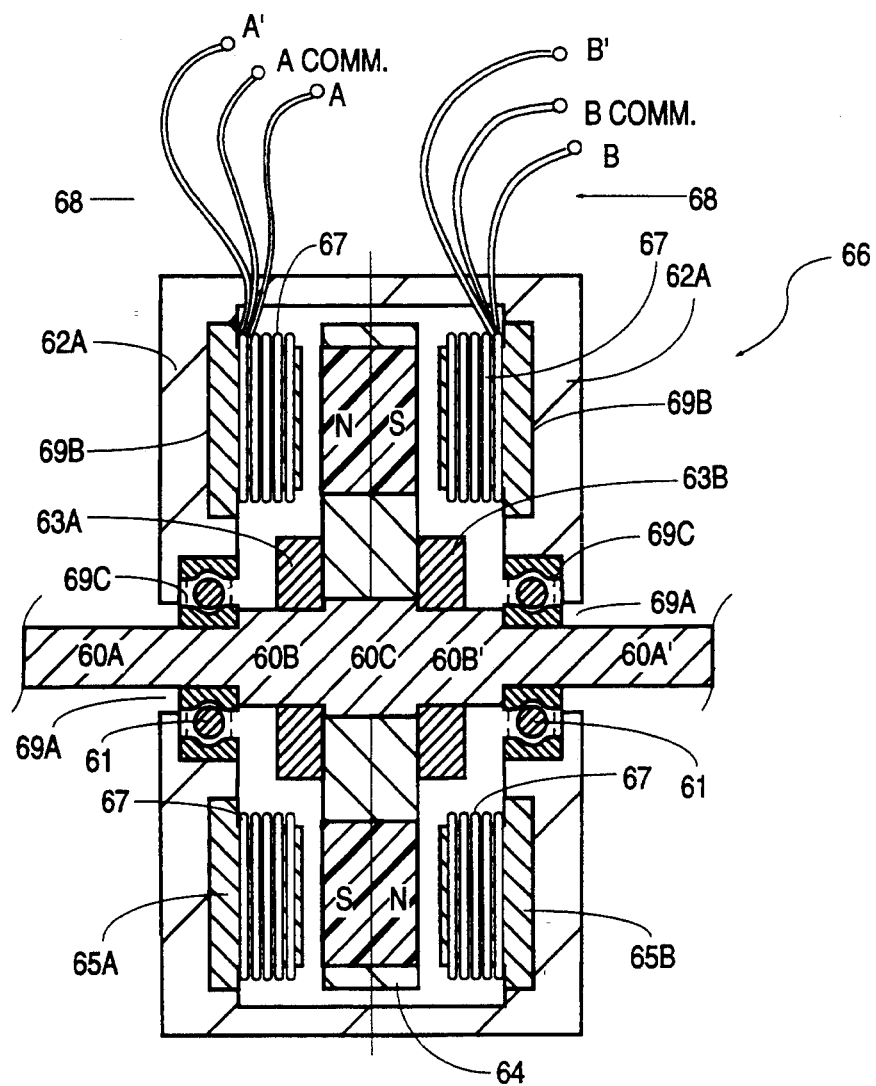
FIG. 7 shows a cross-section of the composite magnet stepping motor shown in FIG. 6.

Sections 60A and 60A' are centered in holes 69A in motor housing members 62A and 62B, respectively, and supported by bearings 61 (FIG. 7). Bearings 61 provide a low friction interface between shaft 60 which rotates and motor housing 62A/62B which is stationary. Sections 60A, 60B, 60C, 60A', 60B', and 60C' are typically formed integrally, thereby providing a strong shaft for high torque conditions. Shaft 60 is generally constructed of a non-magnetic material, such as aluminum or stainless steel. Motor housing members 62A and 62B, also made from non-magnetic material, secure stator members 65A and 65B with annular indentations 69B. Annular indentation 69C, also formed in housing member 62A and 62B, hold bearings 61.

Left spacer 63A, which is press-fitted onto shaft 60B, provides a flat surface against one face of composite magnet 64. Right spacer 63B, fitted on shaft section 60B', provides a flat surface against the other face of composite magnet 64. Thus, composite magnet 64 is sandwiched between left spacer 63A and right spacer 63B. Because left spacer 63A and right spacer 63B form planes that are perpendicular to shaft 60, left spacer 63A and right spacer 63B eliminate any axial wobble of composite magnet 64 that would otherwise occur. Both left and right spacers 63A and 63B are formed from non-magnetic material.

Note that the number of members shown in FIG. 6 is significantly reduced from that in the prior art (see, for example, U.S. Pat. No. 4,207,483 issued to Baer). Therefore, the cost of manufacture of a stepper motor in accordance with the present invention is lower than in the prior art. Additionally, these members are easily tooled and assembled, thereby further reducing the cost to manufacture a stepper motor.

Furthermore, as mentioned previously in regard to the area of energy conversion per unit volume, the power of the composite magnet used as a rotor in the stepping motor is typically greater than that provided by prior art stepper motors of equal size. Therefore, the cost per unit power is less than a conventional stepper motor.

FIG. 7 illustrates stepper motor 66 of FIG. 6 in cross-section. Pole pieces 67 are formed on stator members 65A and 65B. Phase windings 68, wound around the pole pieces 67, form electromagnets which, depending upon the current flow through phase windings 68 (described in detail below), create an apparent north or south pole at any given pole piece 67 surface adjacent to composite magnet 64.

Figure 8:
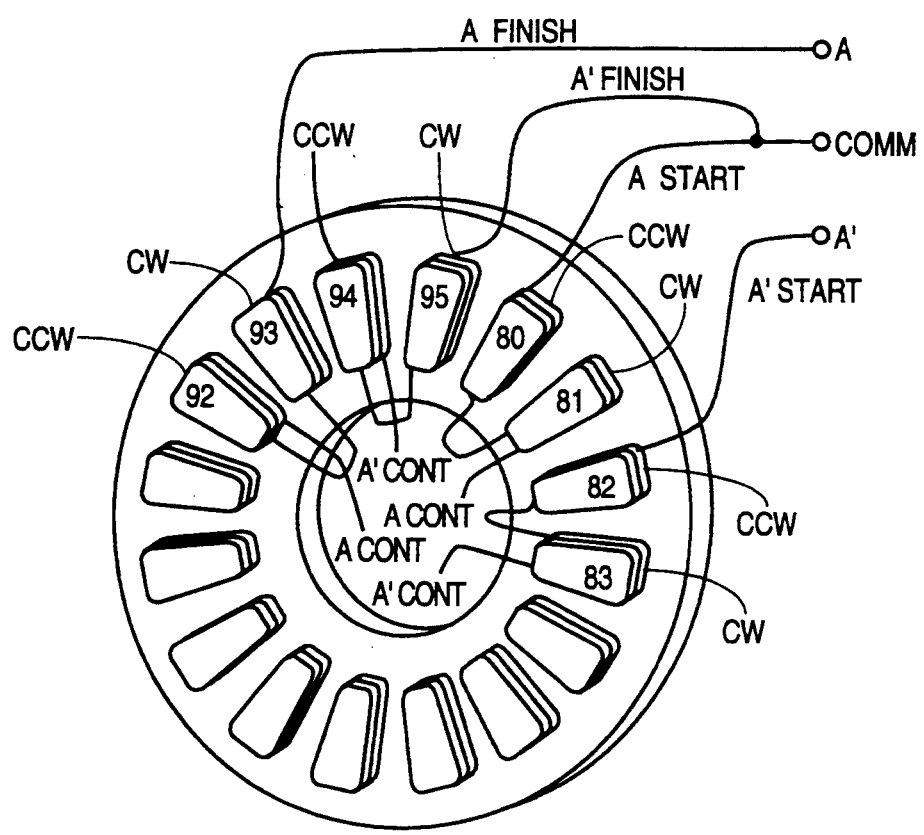
FIG. 8 shows a partial perspective of the windings on one stator plate.

Each stator member 65A or 65B has two phases formed by coils wound on pole pieces 67. As illustrated in FIG. 7, stator member 65A includes phase A and phase whereas stator member 65B includes phase B and phase FIG. 8 shows a partial, perspective view of phases A and A' on stator member 65A. Phase A starts at common node COMM, then begins a counter-clockwise winding around Dole piece 80, followed by a clockwise winding around pole piece 81. Pole pieces 82 and 83 are skipped, then pole pieces 84 and 85 (shown in FIG. 9A) are wound counter-clockwise and clockwise, respectively. This winding pattern continues around stator member 65A until the last pair of pole pieces associated with phase A, in this case pole pieces 92 and 93, are wound. The finish of phase A is left floating.

Phase A' starts at pole piece 82 with a counter-clockwise winding and a clockwise winding around pole piece Pole pieces 84 and 85 (shown in FIG. 9A) are skipped, then pole pieces 86 and 87 (also shown in FIG. 9A) are wound counter-clockwise and clockwise, respectively. This winding pattern continues until the last pair of pole pieces associated with phase A', pole pieces 94 and 95, are wound. The finish of phase A' is connected to the common node COMM. Thus, phase A is wound around every other pair of pole pieces on stator member 65A. Phase A' is also wound around every other pair of pole pieces, thereby balancing the torque produced by the pole pieces on stator member 65A.

Figure 9A:
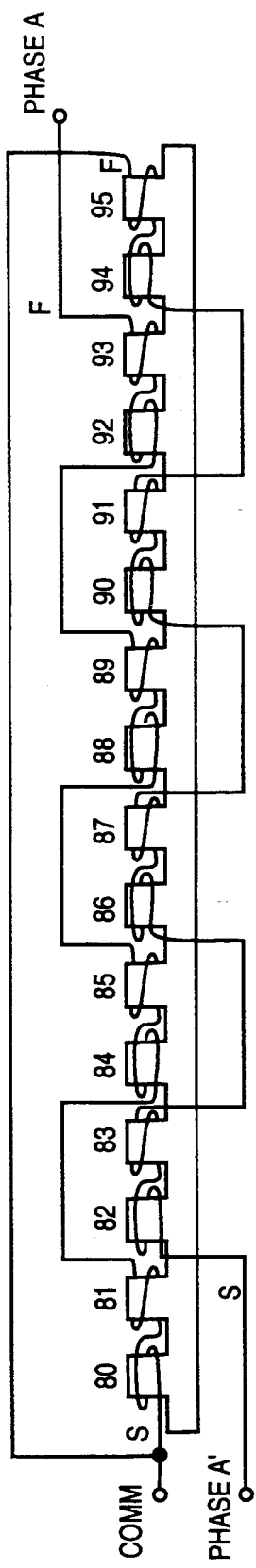
FIG. 9A shows a diagram of a linear view of the windings illustrated in FIG. 8.
Figure 9B:
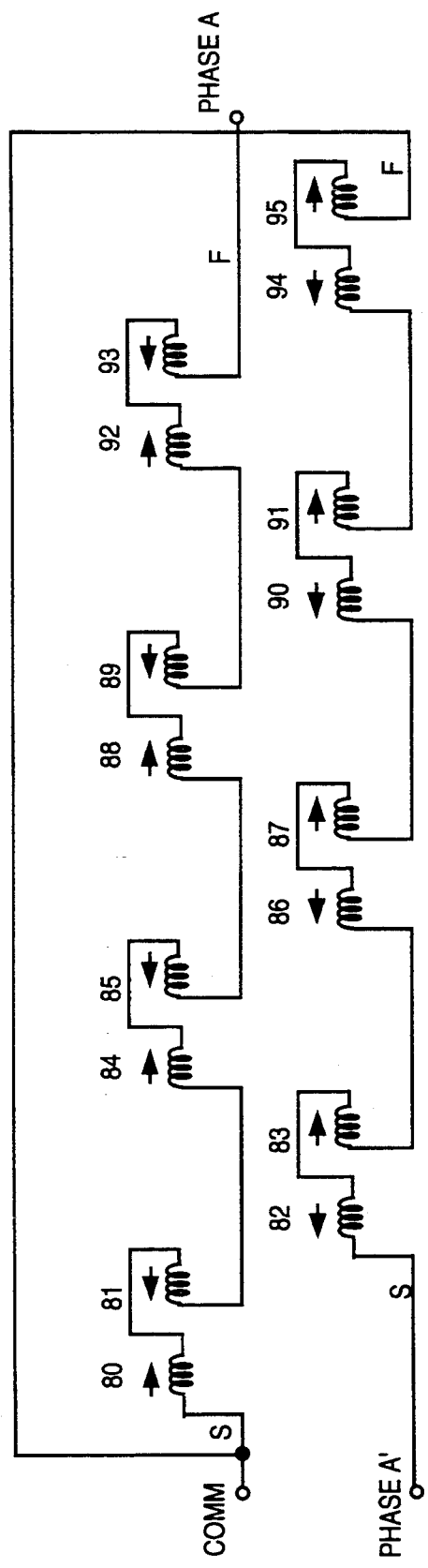
FIG. 9B illustrates that each pair of coils has current flowing in opposite directions, thereby providing opposite polarities in the pole pieces.

FIG. 9A illustrates an unwrapped linear view phase A and phase A' windings on stator member 65A. All sixteen pole pieces 80–95 are shown. Additionally, the start S and finish F of phase A and A' are shown (see also FIG. 8). FIG. 9B illustrates that because the coils for each pair of pole pieces are wound in opposite directions the currents flowing through the coils oppose each other. This difference in current flow produces opposite polarities in the pole pieces. Thus, referring back to FIG. 9A, if current flows through phase A and pole piece 80 (as a result of this current flow) has a north polarity, pole piece 81 has a south polarity. Pole pieces 82 and 83 have north and south polarities, respectively, because of the permanent polarities of the adjacent composite magnet (seen more clearly in FIG. 10). Note that the finish F of phase A' is connected to the common node COMM, which is then coupled to a voltage supply of, for example, twelve (12) volts. In this manner, when phase A' is activated, current flows through phase A' in the opposite direction, thereby producing polarities on the pole pieces opposite to those produced by phase A activation.

In one embodiment, phases A, A', B and B' are constructed from 36 AWG wire having a diameter of 0.006 inches (0.0152 cm), and a resistance of approximately 0.415 Ohms/foot (0.0136 Ohms/cm). The length of wire for one complete turn around a pole piece (i.e. a coil) is approximately 0.9 inches (2.286 cm). The number of turns for one pole piece is, for example, 100. Thus, the length of wire required for one pole piece is about 90 inches (228.6 cm). In this embodiment of the present invention, eight pole pieces must be wound for each phase. Therefore, each phase has a wire length of 720 inches (1828.8 cm), which provides a resistance of 24.9 Ohms (0.415 Ohms/ft$\times$1 foot/12 inches$\times$720 inches).

Figure 10:
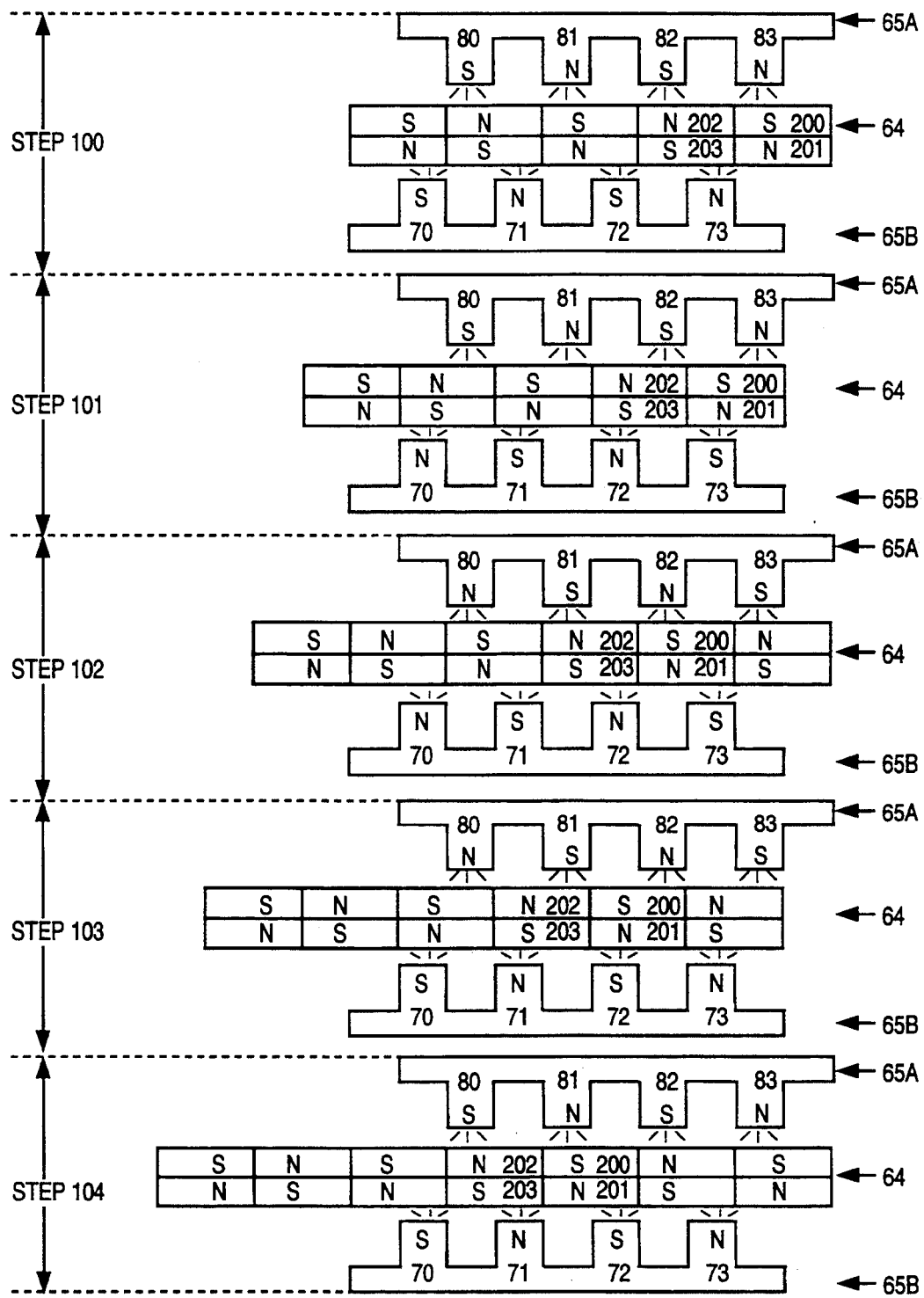
FIG. 10 shows schematically the full stepping sequence in one embodiment of the present invention.

FIG. 10 illustrates a linear, schematic representation of pole pieces on stator members 65A and 65B in relation to the permanent north/south poles on composite magnet 64. For simplicity, only four pole pieces are shown on each stator member. Stator member 65A and stator member 65B are positioned relative to one another such that a pole piece on stator member 65A is angularly displaced from another pole piece on stator member 65B by ¼ pole pitch, i.e. 90 magnetic degrees.

In step 100, composite magnet 64 is in its rest position. In this position, south pole 200 on composite magnet 64 is attracted to pole piece 83 on stator member 65A which exhibits a north pole. Similarly, north pole 202 is attracted to pole piece 82. Simultaneously, north pole 202 is repelled by pole piece 83 because of its north face. Similar attraction and repelling forces are present because of stator member 65B.

In step 101, the polarity of pole pieces 80–83 remains the same while the polarity of pole pieces 70–73 on stator member 65B has been switched. For example, pole piece 73 in step 100 exhibites a north pole, whereas in step 101 pole piece 73 exhibits a south pole. Thus, the previous attraction of south pole 203 to pole piece 73 turns to a repulsion, and the previous repulsion of south pole 203 to pole piece 72 turns to attraction. In this manner, composite magnet 64 is shifted through a ¼ pole-pitch in one angular direction. This ¼ pole-pitch corresponds to an approximately 11.25 degree angular turn in composite magnet 64.

In step 102, the polarity of pole pieces 70–73 remains the same as in step 101, but the polarity of pole pieces 80–83 switches. This switch results in south pole 200 now being attracted to pole piece 82 which is exhibiting a north pole, and being repulsed by pole piece 83 which is exhibiting a south pole. Thus, composite magnet 64 is shifted another ¼ pole pitch in the same angular direction.

Composite magnet 64 is subsequently moved through another ¼ pole pitch by reversing the polarity of the pole pieces on stator member 65B, as shown in FIG. 10. In step 104, composite magnet 64 is further moved another pole pitch in the same angular direction by reversing the polarities on pole pieces 65A. Therefore, in reference to step 100, composite magnet 64 completes a full pole pitch, i.e. 360 magnetic degrees in step 104.

In accordance with the present invention, composite magnet 64 remains at a detent position, i.e. at any position indicated in steps 100-104, irrespective of whether current is flowing. In particular, if a power outage occurs, the magnetic forces of the polarities on composite magnet 64 on the pole pieces maintain composite magnet 64 in its last detent position. Note that when neither stator member 65A nor 65B is activated, the polarities established on the pole pieces are a result of the influence of the permanent poles on composite magnet 64. In this manner, when power is restored, the stepper motor simply starts at this last detent position.

Reversing polarities of the pole pieces is accomplished, in one embodiment, by providing current in a complementary phase. For example, referring to FIG. 8, if current is provided to phase A, polarities are reversed by instead providing current to phase A'. Thus, for this embodiment, only one phase from each stator member during each step or detent is activated to operate the stepper motor. A summary of possible phases is shown below in Table 1 in which "0" means that no current is provided and "1" means current is provided.

TABLE 1

| Step | A | A' | B | B' |
|------|---|----|---|----|
| 101  | 1 | 0  | 0 | 1  |
| 102  | 0 | 1  | 0 | 1  |
| 103  | 0 | 1  | 1 | 0  |
| 104  | 1 | 0  | 1 | 0  |

Progressing from step 101 to step 104 moves the composite magnet in one angular direction while progressing from step 104 to step 101 moves the composite magnet in the opposite angular direction.

Figure 11:
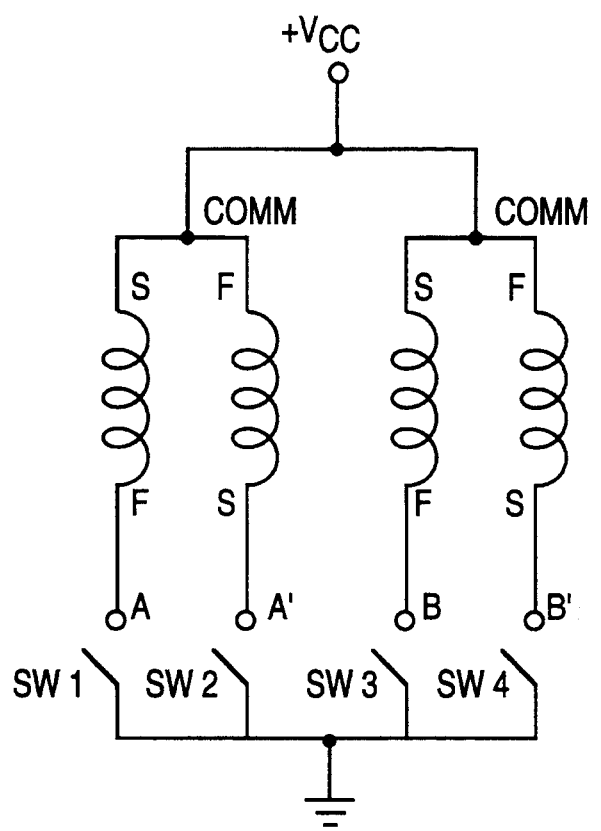
FIG. 11 illustrates a unipolar drive connection in accordance with the present invention.

A typical unipolar drive connection to accomplish this reversal of polarities is illustrated in FIG. 11. In FIG. 11, four switches, SW1, SW2, SW3, and SW4, are selectively connected to phases A, A', B and B', respectively. Each phase has start S or finish F connected to common node COMM. Common node COMM is coupled to a voltage source Vcc which typically may be 5, 12, or 24 volts. Each switch is connected to ground. Closing a switch provides a current through the phase associated with that switch. For example, if switches SW2 and SW3 are closed, current is provided to phases A' and B. Note this condition corresponds to step 103 as shown above in Table 1.

Figure 12:
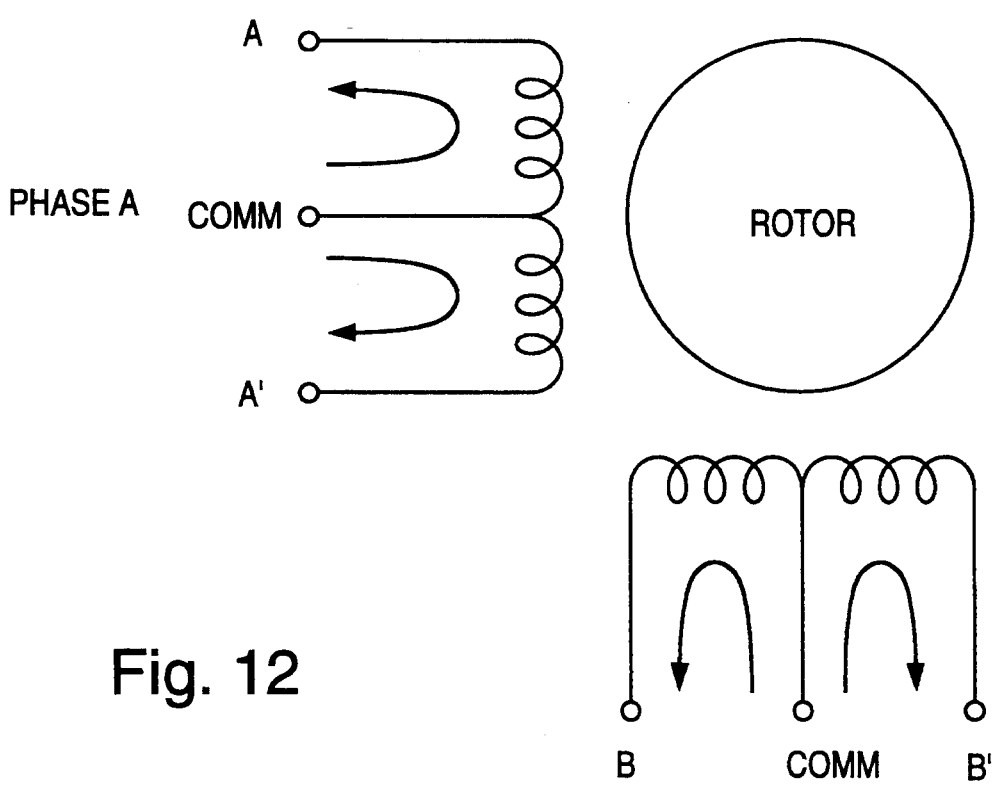
FIG. 12 illustrates that the two phases on one stator member are positioned at 90° magnetically from the two phases on the other stator member.

In this embodiment of the present invention, phases A and A' are positioned at 90° magnetically from phases B and B' as shown schematically in FIG. 12. In this configuration, three options for driving stator members 65a and 65B are possible. First, referring to FIG. 11, the stator members can be driven in a unipolar manner by closing one switch, thereby connecting the resistance associated with a particular phase to ground. This connection generates a current from the voltage source Vcc through the resistance. Second, phases B and B', for example, are connected in series to an H-bridge (not shown) with common node COMM between the two phases. In this manner, if phase B is connected to voltage source Vcc, phase B' is simultaneously connected to ground. Thus, the resistance of the system is twice that of the unipolar connection of FIG. 11, thereby effectively reducing the current by one-half. Finally, phases B and B' are connected in parallel to an H-bridge (also not shown). In this configuration, the resistance of the system is one-half of that in the unipolar configuration, thereby doubling the current. Because all drive connections are well known by those skilled in the art, no further detail on the operation of these connections is provided.

Figure 13:
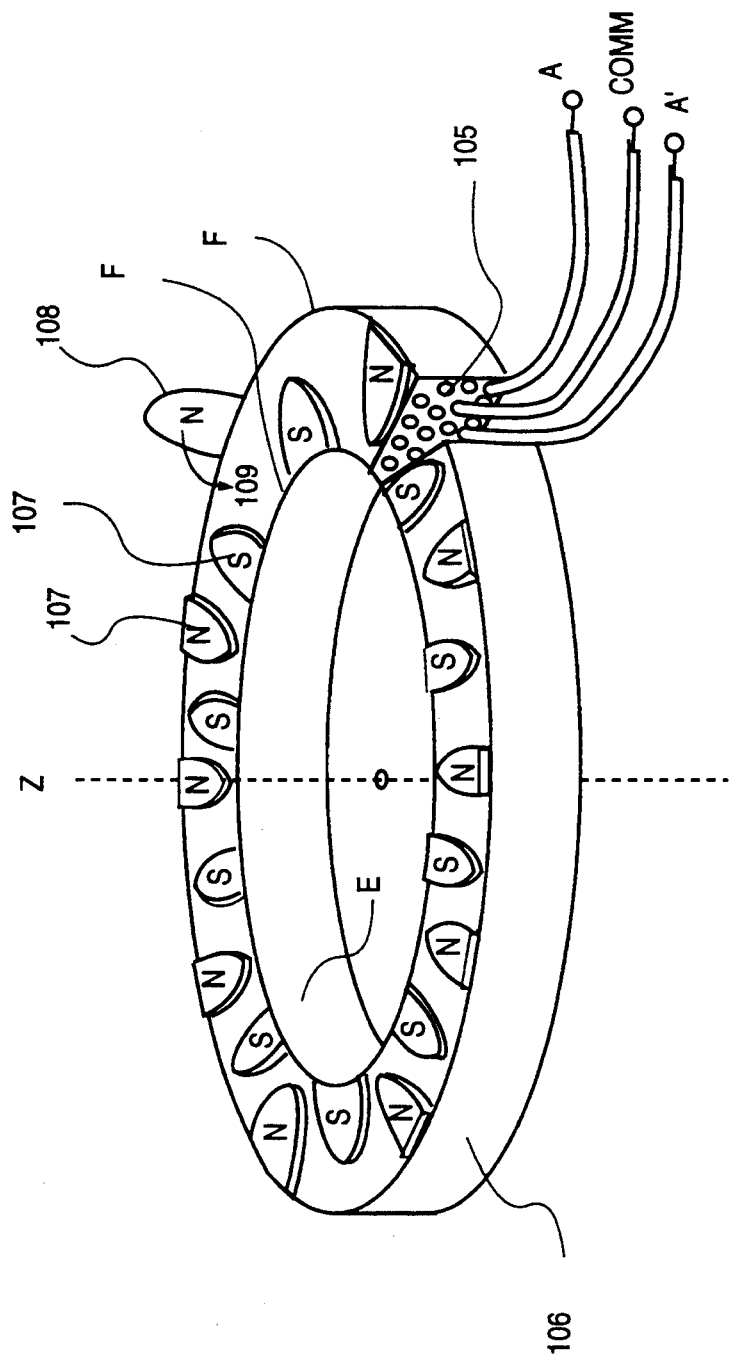
FIG. 13 shows another embodiment of the stator winding assembly in accordance with the present invention.

FIG. 13 illustrates an alternate stator winding assembly in which windings 105 (comprising, in this example, phases A and A' and common node COMM) are wound circumferentially and are placed inside of a hollow, toroid-shaped (i.e. donut-shaped) trough 106. Trough 106 is typically formed out of a material which has high permeability, and is highly magnetic and ductile in nature. This assembly is geometrically distinguished from a can stack or a clawed pole stepper motor (which have fingers on the inside ring E to cause movement of a cylinder placed along the Z-axis) by including fingers 107 on edges F of trough 106. Fingers 107 are then bent down into the position shown (see, for example, finger 108 which is bent in direction 109), thereby enclosing windings 105 and eventually forming alternate north-south poles around a plane in the z-axis. These poles are usually referred to as "hetero-poles". The magnetic polarity is determined by the direction of current flow in windings 105.

Figure 14:
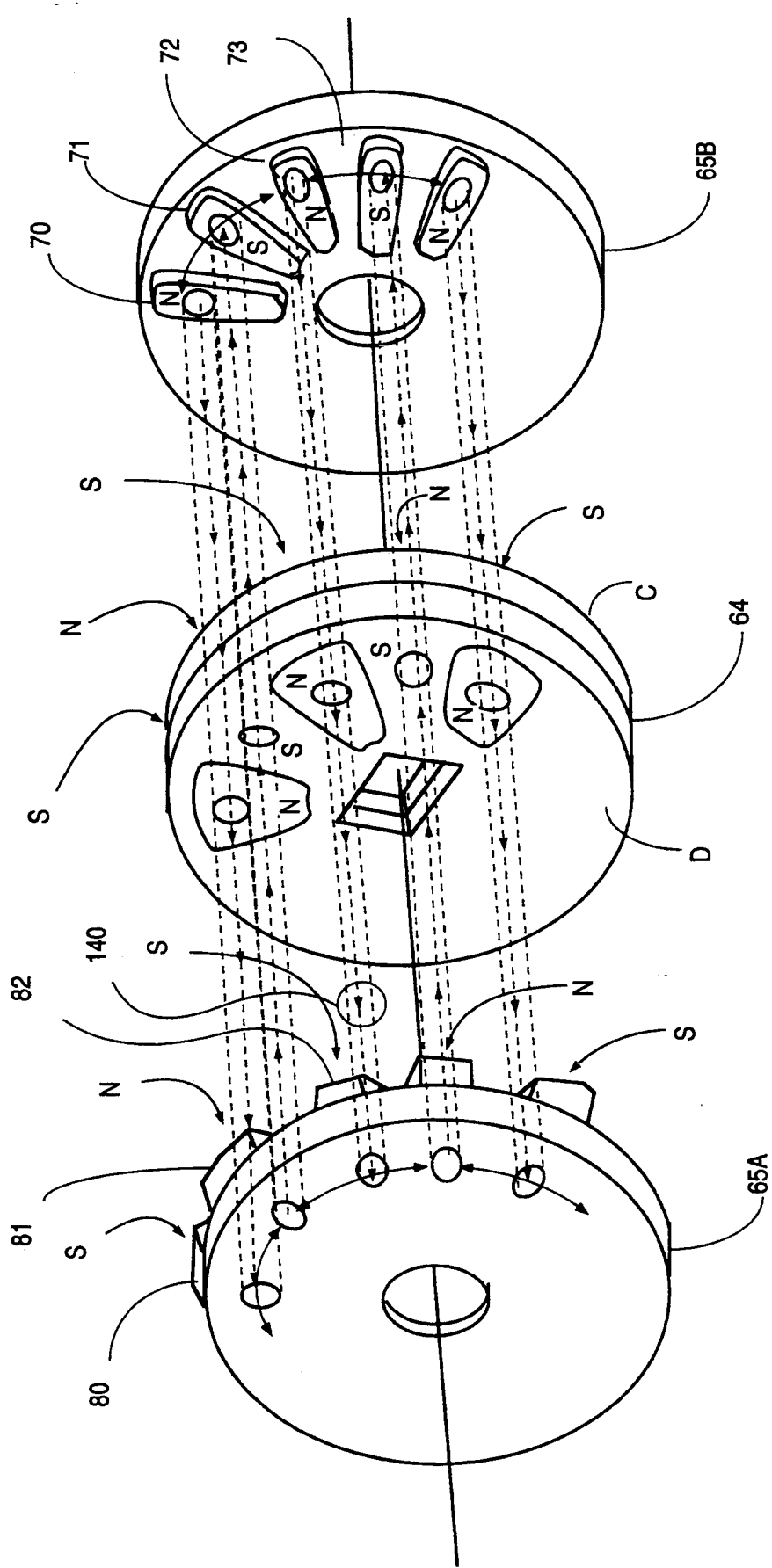
FIG. 14 shows an exploded perspective view of the composite magnet and two stator members with four flux loops illustrated schematically.
Figure 15:
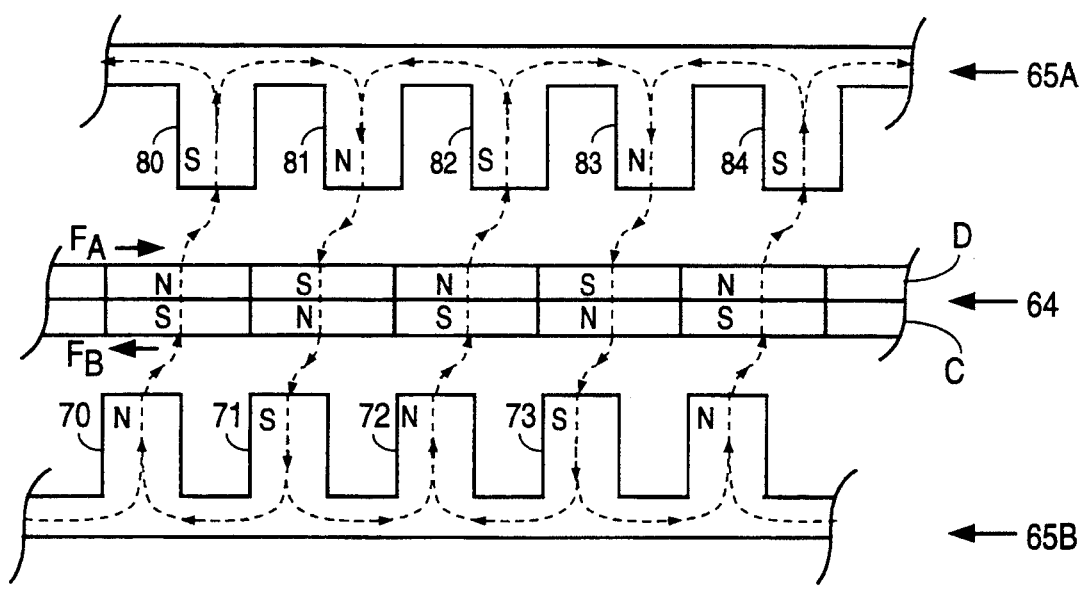
FIG. 15 illustrates schematically a linear section of the composite magnet, the two stator members, and a flux path.

FIG. 14 shows composite magnet 64 and stator members 65A and 65B with four flux loops illustrated schematically. FIG. 15 illustrates a linear section of these same components to further clarify the flux path. Referring to the flux path 140 in FIG. 14, note the magnetic flux pattern is established from north to south poles. For example, the flux path 140 begins at pole piece 72 which exhibits a north face, travels through the south pole on side C and the north pole on side D of composite magnet 64. Thus, when a flux path is established between all pole pieces through composite magnet 64, a "cylinder" of parallel magnet circuits is formed. The path continues to pole pieces 82 on stator member 65A which exhibits a south face. At this point, as seen more clearly in FIG. 15, the path diverges. One half of the flux travels to adjacent pole piece 81 and the other half of the flux travels to pole piece 83, both pieces exhibit north poles. Thus, a flux path in the stator members is in a perpetual state of being halved or doubled.

The magnetic flux travels in the shortest possible path through the air gap established between stator members 65A and 65B and composite magnet 64. As shown in FIG. 15, stator member 65A exhibits a force $F_A$ on composite magnet 64 while stator member 65B exerts an opposite force $F_B$ on the composite magnet. When forces $F_A$ and $F_B$ are equal in magnitude, composite magnet 64 is in equilibrium, i.e. in its detent position. Thus, composite magnet 64 will resist movement and attempt to return to its detent position if forces $F_A$ and $F_B$ are unequal.

Figure 16B:
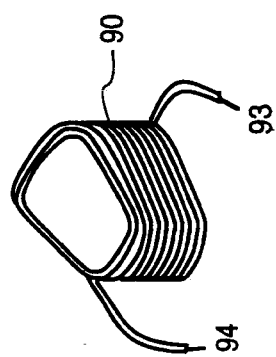
FIG. 16B illustrates a coil which is pre-formed and subsequently bonded to the PC board shown in FIG. 16A.
Figure 16A:
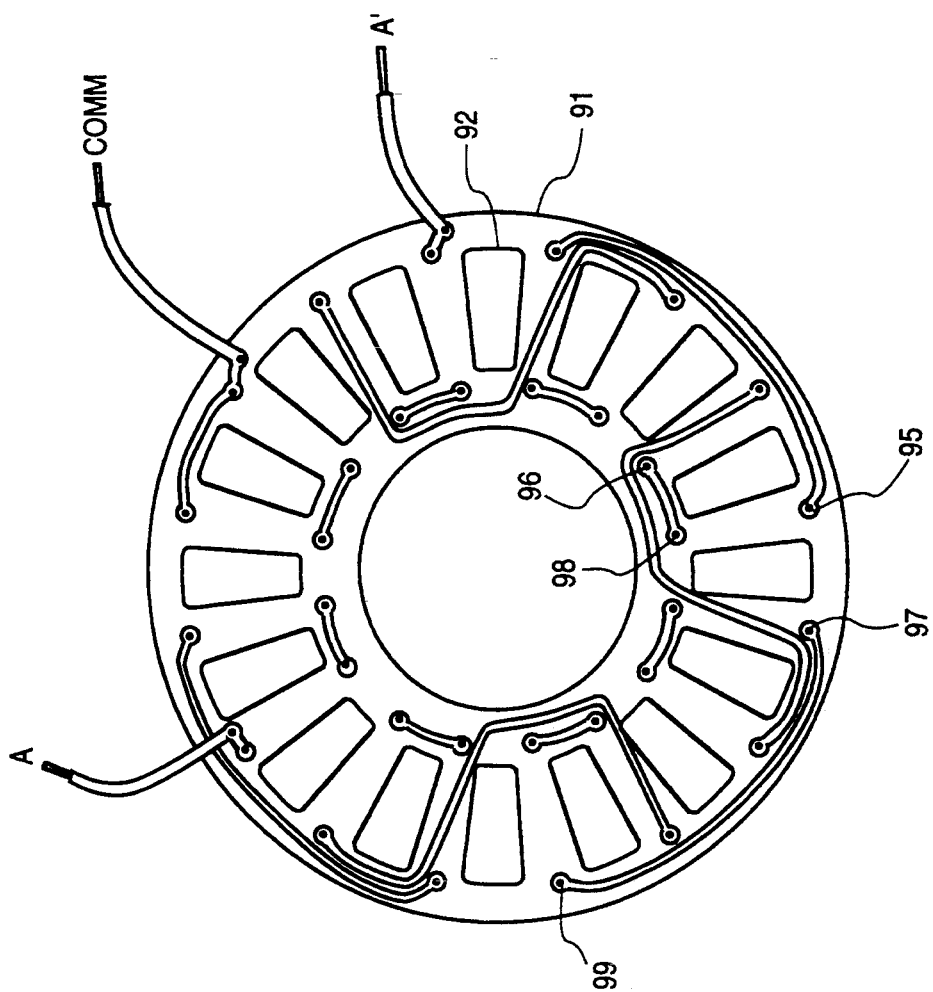
FIG. 16A shows a PC board which is adhesively coupled to a stator plate in one embodiment of the present invention.

In another embodiment of the present invention, the interconnection of individual coils on stator member 65 (FIG. 6) are formed using standard PC board assembly processes. Referring to FIGS. 16A and 16B, a pole piece coil 90 is pre-wound to conform to any pole piece 67 (FIG. 7). Coil 90 is then bonded, i.e. exposed to a current which heats coil 90 above the thermal limits of its insulation, thereby causing coil 90 to form a solid component. Coil 90 is then adhesively connected to PC board 91 surrounding each hole 92. PC board 91 comprises standard PC board material, typically epoxy glass, which is 0.03 inches (0.076 cm) thick. Copper traces are formed on PC board 91 to provide inner connection between coils 90. For example, as seen in FIG. 16B, coil 90 has ends 93 and 94 which are connected to trace ends 95 and 96, respectively. Connection is done typically by wave soldering. Similarly another coil 90 is connected to trace leads 97 and 98. Thus, current flows from trace end 95 through coil 90 from ends 96 to end 98 through another coil 90 to trace end 97. Note trace end 97 skips two pole pieces and ends at trace end 99. This connection achieves the electrical configuration shown in FIGS. 9A and 9B. After all coils 90 are bonded to the traces by wave soldering, PC board 91 is connected to stator member 65. This connection is commonly done with adhesive. In this manner, manufacturing and assembly costs for stator members 65 are significantly reduced.

FIGS. 17A, 17B, and 17C illustrate a planar, side, and oblique view, respectively, of one-half of another composite magnet for an application in a stepper motor. Referring to these figures, piece 200A is formed with a mating member 202A and an arc-shaped member 201A integrally formed with mating member 202A. Mating member 202A protrudes from the arc-shaped member 201A and is typically one-half the thickness 204 (FIG. 17B) of the arc-shaped member 201A. In one embodiment, piece 200A has a height 203 of 2.4 inches (6.10 cm), arc-shaped member 201A has a thickness 204 of 0.16 inches (0.41 cm), mating member 202A has a thickness 206 of 0.08 inches (0.20 cm) and a diameter 205 of 0.8 inches (2.03 cm). Mating member 202A has a hole 211 formed completely therethrough which is ⅜ inch square (0.95 cm square).

Figure 18:
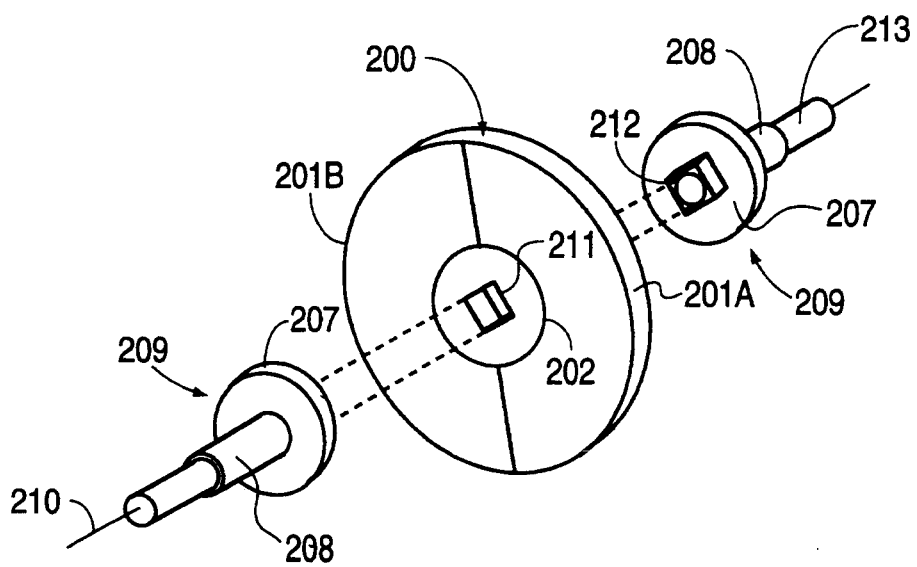
FIG. 18 shows an exploded view of the composite magnet and the press assemblies which secure the magnet to the rotor shaft.

To form the composite magnet, the two mating members 202A and 202B are positioned on a common axis via a shaft extending through holes 211 in pieces 200A and 200B (explained in detail in reference to FIG. 18). In this manner, arc-shaped members 201A and 201B are juxtaposed, thereby forming a disc-shaped composite magnet 200 having two flush surfaces (see FIG. 18, for example).

In other embodiments of the present invention (not shown), instead of arc-shaped members 201 having a 180 degree configuration such that composite magnet 200 forms a disc, arc-shaped members 201 have a 90 degree configuration such that composite magnet 200 forms a half disc.

To provide the magnetic poles on the rotor, pieces 200A and 200B are magnetized in opposite axial directions. As shown in FIG. 17D, this magnetization results in some repulsion as pieces 201A and 201B are mated. For example, assuming a magnetization M shown in FIG. 17D, both the bottom surface of mating member 202B and the top surface of mating member 202A have north poles. Therefore, these two surfaces repel one another. However, there is a much stronger attraction between the south pole of the top surface of piece 202B and the north pole of the top surface of piece 202A, as well as the south pole of the bottom surface of piece 202A and the north pole of the bottom surface of piece 202B. In other words, this configuration of a rotor (i.e. composite magnet 200 and a shaft) provides a complete magnetic circuit, thereby overpowering any repulsion between pieces 200A and 200B. The strong bond between pieces 200A and 200B forms the composite magnet. In this manner, composite magnet 200 acts as a single permanent magnet exhibiting a magnetic pattern of north-south poles matching the pattern of arc-shaped members. Thus, the composite magnet, in addition to providing manufacturing simplicity, ensures well-defined north-south poles.

In one embodiment, to provide additional cohesion between pieces 201A and 201B, an adhesive is placed on the mating surfaces of mating members 202A and 202B. In other embodiments, a gasket-like material is formed between the pieces. This gasket-like material, such as a polyurethane-type adhesive, provides flexibility to the rotor assembly if possible thermal expansions or contraction occur after manufacture.

For manufacturing ease, pieces 201A and 201B are typically formed from any moldable magnetic material. Examples of these materials are mentioned previously in reference to FIGS. 1–4 and therefore are not explained in detail. In one embodiment of a composite magnet used in a torquer, a neodymium material available from 3M, having the tradename Neodymium 2002B is used.

Figure 19:
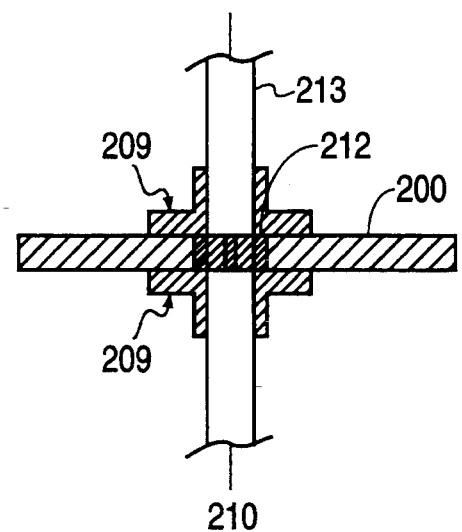
FIG. 19 illustrates a cross-sectional view of the composite magnet, press assemblies, and shaft in accordance with the present invention.

FIG. 18 shows an exploded view of a composite magnet 200 and two press assemblies 209 which secure composite magnet 200 to a rotor shaft 213. Each press assemblies 209 includes a washer portion 207 and a boss portion 208. Note that washer portion 207 is integrally formed with boss portion 208 using conventional machining methods. The washer portions 207 prevent any wobble of composite magnet. One washer portion 207 has a square projection 212 (also integrally formed with press assembly 209) which mates with the hole 211 of composite magnet 200, thereby preventing any slippage of composite magnet 200 on shaft 213 (on axis 210). FIG. 19 illustrates a cross-sectional view of the composite magnet 200, press assemblies 209, and shaft 213 as assembled in accordance with the present invention.

Figure 20A:
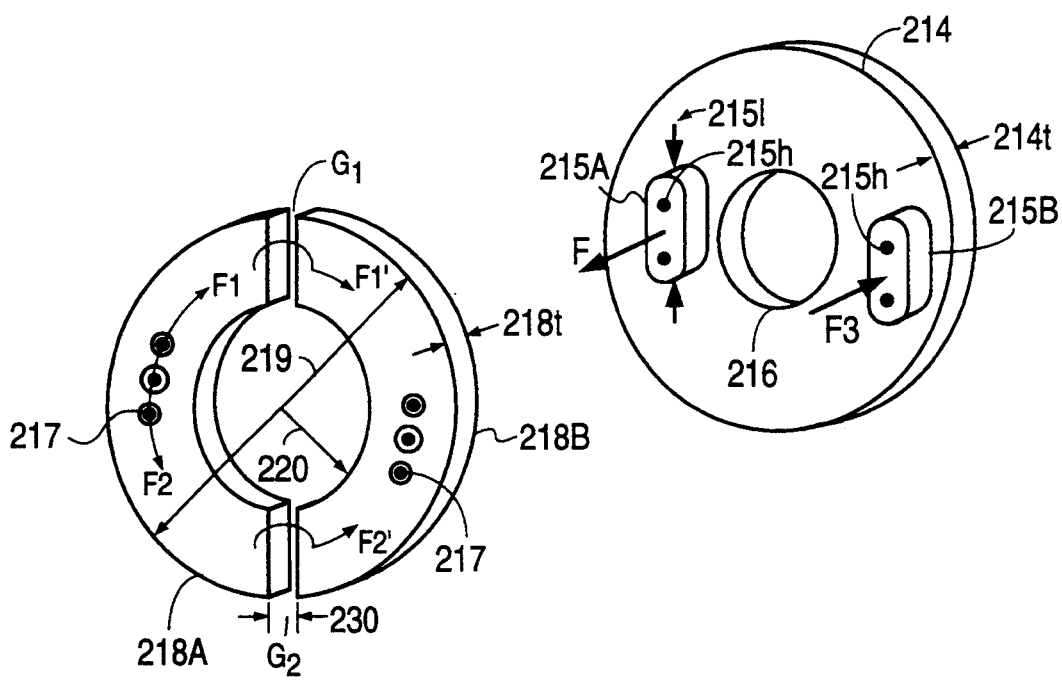
FIG. 20A shows perspective views of a stator plate and a pole shoe for a stepper motor in accordance with the present invention.

FIG. 20A shows perspective views of a stator plate and a pole shoe for a stepper motor in accordance with one embodiment of the present invention. Stator plate 214 includes two integrally-formed pole pieces 215A and 215B. In one embodiment, stator plate 214 has a thickness 214t of 0.2 inches (0.51 cm) and each pole piece 215 has a length 215l of 1.0 inch (2.50 cm). Note that if the stepper motor is used as a torquer, only one pole piece 215 is needed.

To maximize working flux, the present invention includes two pole shoes 218A and 218B. In this embodiment, pole shoe 218A and pole shoe 218B form a split donut shape having approximately a 3 degree of arch length separating the two pole shoes. In this embodiment, each pole shoe 218 has a thickness 218t of 0.15 inches (0.38 cm). In the final assembly (see FIG. 20B which shows a partial assembly), pole shoes 218 have an outside diameter 219 of 2.4 inches (6.10 cm) and an inside diameter 220 of 0.80 inches (2.0 cm). Molded pins or screws 217 mate with the holes 215h on pole pieces 215A and 215B.

Figure 20B:
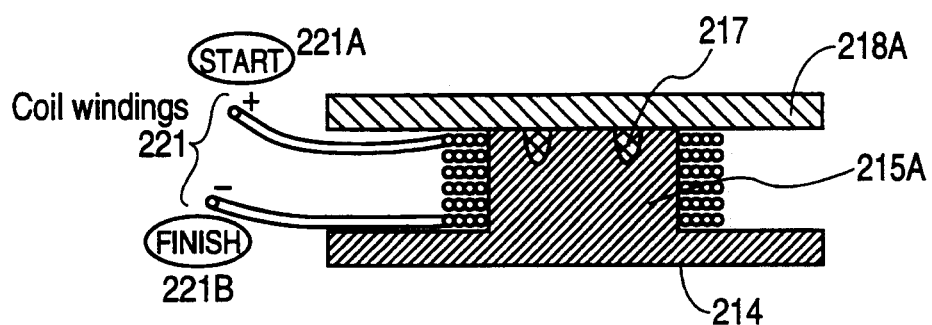
FIG. 20B illustrates a cross-sectional view of the stator plate with coils and the pole shoe as assembled in the motor.

FIG. 20B illustrates a cross-sectional view through pole piece 215A, stator plate 214 with coils 221 wound around pole piece 215, and pole shoe 218A as assembled in the motor. Note that coils 221 have a start 221A and a finish 221B. Coils 221 are typically positioned on pole pieces before stator plate 214 and pole shoes 218A and 218B are coupled.

Optimally, total flux in a stepper motor is limited to the flux between the stator plate and the composite magnet. However, flux in a real motor frequently includes undesirable flux loops. The present invention minimizes these undesirable flux loops. FIG. 20A shows one undesirable loop of the total magnetic flux between stator plate 214 and pole shoes 218A and 218B.

Referring to FIG. 20B, coil windings 221, wound around the pole pieces 215A, form an electromagnet which, depending upon the current flow through coil windings 221, create an apparent north or south pole on pole piece 215A. Assume that pole piece 215A (FIG. 20A) is energized to be a south pole, whereas pole piece 215B is energized to a north pole.

In this loop, the flux F comes out of pole piece 215A and enters pole shoe 218A. Upon entering pole shoe 218A, flux F is drawn in two, opposite directions to pole piece 215B. Therefore, at this point, flux F divides into flux F1 and flux F2. Then, flux F1 jumps the gap G1 between pole shoe 218A and pole shoe 218B. In a similar manner, flux F2 jumps the gap G2 between pole shoe 218A and pole shoe 218B. Flux F1' and flux F2' recombine between pins 217 and pass through pole shoe 218B. Finally, combined flux F3 enters pole piece 215B of stator plate 214 to complete the loop.

Figure 22:
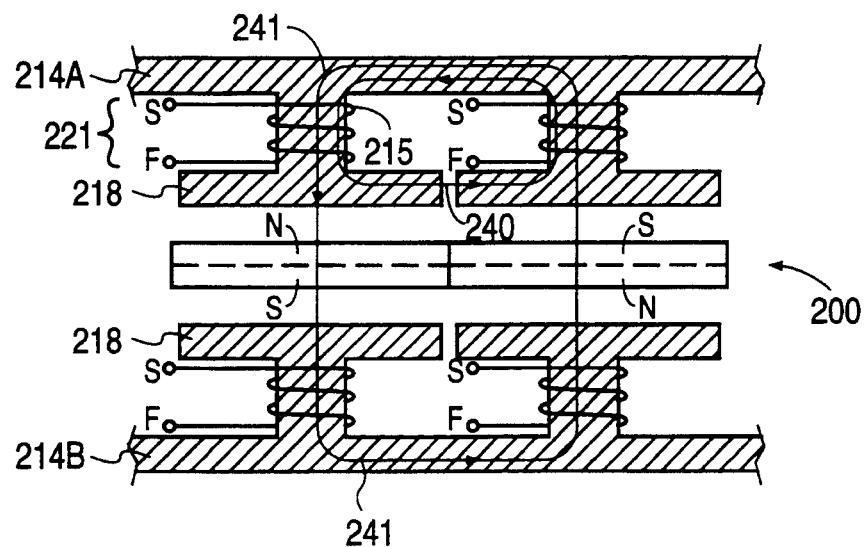
FIGS. 22 shows an unwrapped linear view of the composite magnet and stator poles/pole shoes in accordance with the present invention.

FIG. 22 illustrates this above-described (undesirable) loop 240, as well as loop 241. Loop 241 forms the desirable loop between stator plate 214A, composite magnet 200, and stator plate 214B. The air gaps G1 and G2 between pole shoes 218A and 218B minimize the strength of flux loop 240, while the surface area provided by pole shoes 218A and 218B maximize the strength of flux loop 241. Thus, present invention provides that loop 241 has a much higher strength than loop 240.

Pole shoes 218 are formed from any high-permeability, low-reluctance, soft-magnetic material. In one embodiment, pole shoes 218 are formed from a material manufactured by Hoeganaes under the tradename AnchorSteel SC80 Powdered Metal. This material has extremely high resistivity and very high saturation capability, thereby effectively eliminating any losses due to eddy currents in the pole shoes and minimizing the volume of material necessary for construction of the stator members.

Figure 21A:
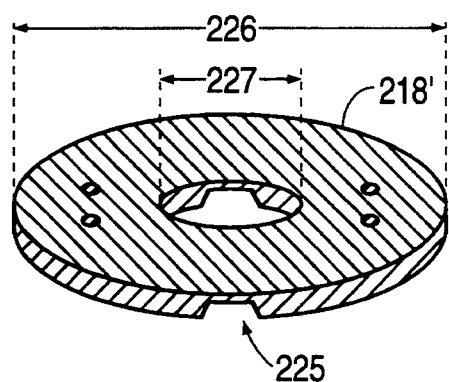
FIGS. 21A and 21B illustrate another embodiment of a pole shoe in accordance with the present invention.
Figure 21B:
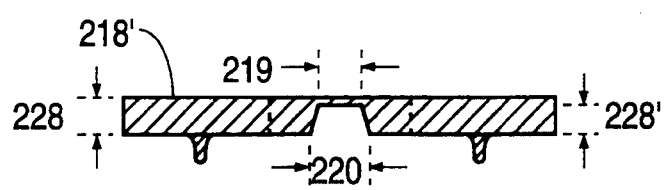

FIG. 21A and 21B illustrate another embodiment of a pole shoe, i.e. multi-pole shoe ring 218', in accordance with the present invention. In this embodiment, multi-pole shoe ring 218' has an outer diameter 226 and inner diameter 227 identical to that of pole shoes 218 (FIG. 20A). A groove 225, traversing the diameter of multi-pole shoe ring 218', provides sufficient saturation (i.e. increases the reluctance) to direct the flux in a similar path to that shown in FIG. 20A. In other words, if the depth of groove 225 is sufficiently deep, and the corresponding width of the groove is geometrically correct, then groove 225 approximates an air gap as it would appear in the magnetic circuit with the pole shoes (FIG. 20A). In this embodiment, the inner width 219 of groove 225 is 0.10 inches (0.25 cm), the outer width 220 is 0.5 inches (1.27 cm), the depth 228' is 0.13 inches (0.33 cm), and the thickness 228 is 0.15 inches (0.38 cm).

Using this configuration, groove 225 closely approximates the function of air gap 230 of pole shoes 218 (FIG. 20A). Multi-pole shoe ring 218' is also typically fabricated from a moldable material as described above in reference to FIG. 20A. Note that this embodiment reduces the number of parts required to assemble the stepper motor, thereby further simplifying manufacturing and reducing assembly expenditures.

The assembly of the stepper motor, other than the addition of the pole shoes or multi-pole shoe ring, is similar to the assembly described in reference to FIG. 6 and therefore is not described in detail.

In accordance with a stepper of the present invention, both the number of magnetic poles on composite magnet 200 and the number of pole pieces 215 on each stator plate is limited to two. In further accordance with the present invention and referring to FIG. 22, the poles pieces 215 of stator plate 214A are aligned with the pole pieces of stator plate 214B.

Note that this configuration differs from the stepper motor described in reference to FIG. 10 in which the pole pieces of one stator plate are positioned 90 magnetic degrees with respect to the pole pieces of the other stator plate. If the two stator plates are rotated by 90 magnetic degrees with respect to each other, then the motor operates as a four-step or 90 degree stepper, i.e. 2 steps per magnetic pole with absolute direction.

In accordance with embodiment described in detail in reference to FIG. 22, if the pole pieces on the two stator plates are directly oppostite each other, then the motor operates as a two-step or 180 degree stepper motor. The two-step configuration provides the advantages of a higher torque output and a greater angle of rotation than the four-step configuration.

Figure 23:
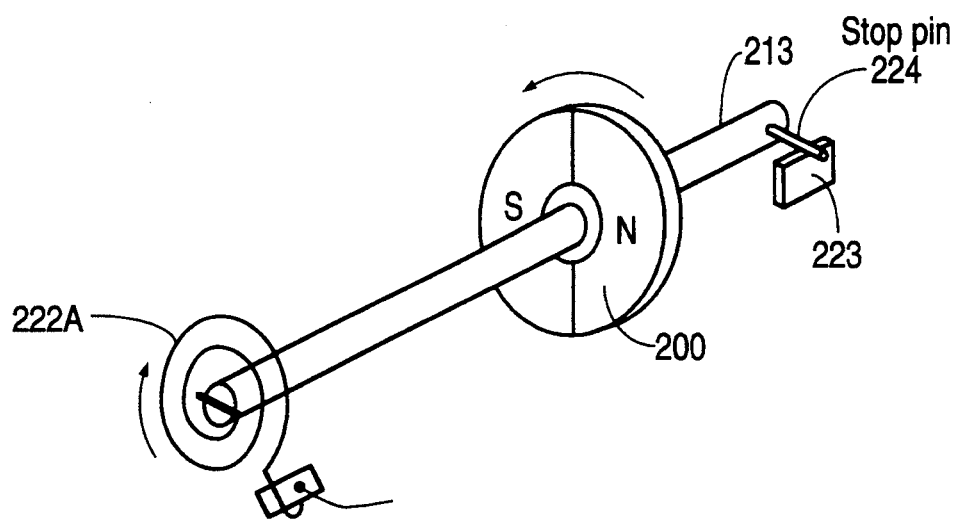
FIG. 23 illustrates a perspective view of the composite magnet on a shaft having a spring and an electromechanical stop, thereby converting the stepper motor into an electro-mechanical torquer device.

However, the direction of rotation of the two-step stepper motor is ambiguous. In one embodiment of the present invention, this ambiguity is corrected by a conventional mechanical stop "biasing" technique shown in FIG. 23. As illustrated in FIG. 23, the rotor comprising composite magnet 200 and shaft 213 is loaded with a torsional spring 222A and "biased" or offset with a stop pin 224 and a mechanical stop 223 to provides absolute direction control. Specifically, the torque produced by spring 222A holds the rotor in the position of mechanical stop 223. If coils 221 (FIG. 22) are energized, the torque produced by the motor opposes that of spring 222A. The difference of motor torque minus the spring torque is then applied to a load (not shown) which is coupled to shaft 213. Thus, spring 222A and mechanical stop 223 (and pin 224) convert the two-step stepper motor to a mechanical torquer. In other words, the spring 222A and mechanical stop 223 limit the functioning of the stepper motor to a one-step stepper motor because spring 222A pulls the rotor comprising composite magnet 200 back to an initial position determined by mechanical stop 223 (and pin 224).

Figure 24:
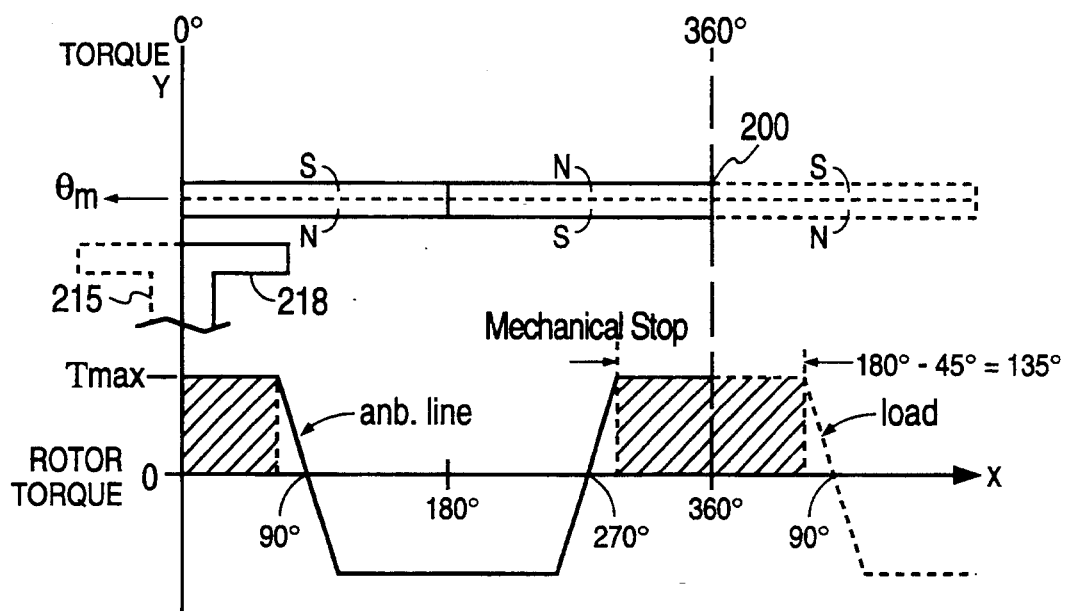
FIG. 24 shows the torque output of the stepper motor as the composite magnet turns through 360 degrees.

FIG. 24 shows the torque output of the stepper motor as the rotor turns through 360 degrees. Specifically, assume the edge of a pole on composite magnet 200 is positioned relative to pole shoe 218 as shown in FIG. 24, i.e. centered on pole piece 215. After the pole piece 215 is activated (and thus pole shoe 218), composite magnet 200 provides a maximum torque for approximately 67.5 degrees of rotation. Then, this torque decreases until it zeroes out at 90 degrees of rotation. Subsequently, the torque turns negative between 90 and 270 degrees of rotation because the rotor attempts to drive in the opposite direction. At approximately 247.5 degrees of rotation, the torque begins to increase and at 270 degrees becomes zero. From 270 degrees rotation to approximately 280 degrees, the torque steadily increases until it reaches its maximum value. Thus, as shown in FIG. 24, a rotor in accordance with the present invention provides a maximum torque value for approximately 135 degrees of rotation.

A typical unipolar drive connection for a stepper motor is illustrated in FIG. 25. In FIG. 25, the coil windings 221 from each pole piece 215 (FIG. 20A) are connected. Therefore, coils $221_1$ and $221_2$ (from one stator plate) are connected and coils $221_3$ and $221_4$ (from the other stator plate) are connected. A common lead from each stator plate, i.e. common leads C1 and C2, are connected, thereby connecting all coils 221 in series. Then, the remaining lead L1 from one stator plate is connected to ground, and the remaining lead $L_2$ from the other stator plate is switchably connected to a voltage source $V_B$ which is typically 12 volts dc. To provide current to coils 221, switch S' is closed. To reverse the current, leads $L_1$ and $L_2$ are flipped.

FIG. 26 illustrates that the two phases, i.e. coils $221_1/221_2$, on one stator member are positioned at 180° magnetically from the two phases, i.e. coils $221_3/221_4$ on the other stator member.

A stepper in accordance with the present invention provides a high torque output over a limited angular displacement, is relatively small in volume, and operates over a large range of voltage and current supplies by redimensioning the coils, i.e. wire size and number of turns. Moreover, the stepper motor is easy to manufacture.

While the invention has been described with respect to certain embodiments, the scope of the present invention is defined by the appended claims and is not necessarily limited to the embodiments described herein, which are merely illustrative. For example, the number of composite magnets and stator members may vary depending on the application. In one application, one two-sided stator member is placed in operative relation to two composite magnets which are then placed in operative relative to two one-sided stator members. This application would provide at least double the torque capability. Moreover, dimensions and materials for all components are illustrative only and vary depending on the application. Accordingly, other embodiments and variations not described herein may be within the scope of the invention, as defined by the appended claims.

I claim:

1. A stepper motor comprising:
   a multi-pole composite magnet having a first piece and a second piece, each piece having a mating member and an arc-shaped member, wherein said first and said second pieces are magnetized in opposite axial directions, wherein the mating members of said first piece and said second piece are aligned to a common axis and the arc-shaped members of said first piece and said second piece are juxtaposed;
   at least one stator member placed in operative relation to said multi-pole composite magnet; and
   means for positioning said composite magnet and said at least one stator member on said common axis.

2. The stepper motor of claim 1 said mating member protrudes from said arc-shaped member.

3. The stepper motor of claim 2 wherein said mating member has one-half the thickness of said arc-shaped member.

4. The stepper motor of claim 2 wherein said first piece and said second piece form a disc-shaped member.

5. The stepper motor of claim 2 wherein said first piece and said second piece form a half disc-shaped member.

6. The stepper motor of claim 2 wherein said at least one stator member includes at least one pole piece.

7. The stepper motor of claim 2 wherein said at least one stator member includes at least two pole pieces.

8. The stepper motor of claim 6 wherein each pole piece has an associated coil, wherein current through said coil determines the magnetic polarity of said pole piece.

9. The stepper motor of claim 8 further including at least one pole shoe coupled to said at least one stator member.

10. The stepper motor of claim 9 wherein said at least one pole shoe includes two pole shoes, one pole shoe being coupled to each pole piece.

11. The stepper motor of claim 10 wherein each pole shoe is aligned with a pole on said composite magnet.

12. The stepper motor of claim 2 wherein said means for positioning comprises a shaft.

13. The stepper motor of claim 12 further including a mechanical stop positioned in operative relation to said shaft.

14. The stepper motor of claim 2 wherein said means for positioning further comprises a housing.

15. The stepper motor of claim 14 further comprising means for preventing an axial wobble of said multi-pole composite magnet, said means for preventing positioned on said shaft.

16. The stepper motor of claim 15 wherein said means for preventing comprises at least one press assembly.

17. The stepper motor of claim 16 wherein said at least one press assembly includes means for preventing slippage of said composite magnet on said shaft.

18. The stepper motor of claim 17 wherein said means for preventing slippage includes a shaped member which mates with a hole in said composite magnet.

19. A method of providing a stepper motor comprising the steps of:
   forming a first piece including a first mating member and a first arc-shaped member integrally formed with said first mating member, said first mating member protruding from said first arc-shaped member;
   forming a second piece including a second mating member and a second arc-shaped member integrally formed with said second mating member, said second mating member protruding from said second arc-shaped member;
   magnitizing said first piece and said second piece in opposite axial directions;
   forming a composite magnet by joining said first piece and said second piece, wherein said first mating member and said second mating member are aligned to an axis, and wherein said first arc-shaped member and said second arc-shaped member are juxtaposed; and
   positioning at least one stator member in operative relation to said composite magnet.

20. A composite magnet comprising:
   a first piece including a first mating member and a first arc-shaped member integrally formed with said first mating member, said first mating member protruding from said first arc-shaped member; and
   a second piece including a second mating member and a second arc-shaped member integrally formed with said second mating member, said second mating member protruding from said second arc-shaped member, wherein said first piece and said second piece are magnetized in opposite axial directions, wherein said first mating member and said second mating member are aligned to an axis, and wherein said first arc-shaped member and said second arc-shaped member are juxtaposed.

* * * * *

UNITED STATES PATENT AND TRADEMARK OFFICE
CERTIFICATE OF CORRECTION

PATENT NO. : 5,369,323
DATED     : November 29, 1994
INVENTOR(S) : Elmer C. Allwine, Jr.

It is certified that error appears in the above-indentified patent and that said Letters Patent is hereby corrected as shown below:

ON THE TITLE PAGE:

Line [54], change Title to read "COMPOSITE MAGNET STEPPER/TORQUER MOTOR".

Signed and Sealed this

Twenty-first Day of March, 1995

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,369,323
DATED : November 29, 1994
INVENTOR(S) : Elmer C. Allwine, Jr.

It is certified that error appears in the above-indentified patent and that said Letters Patent is hereby corrected as shown below:

On the title page, item [73] delete "Slonix Engineering, Santa Clara, Calif.".

Signed and Sealed this

First Day of August, 1995

Attest:

BRUCE LEHMAN

Attesting Officer     Commissioner of Patents and Trademarks